United States Patent
Frascati et al.

(10) Patent No.: US 9,483,861 B2
(45) Date of Patent: Nov. 1, 2016

(54) TILE-BASED RENDERING

(71) Applicant: QUALCOMM Incorporated, San Diego, CA (US)

(72) Inventors: Christopher Paul Frascati, Oviedo, FL (US); Avinash Seetharamaiah, Chuluota, FL (US); Andrew Evan Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 13/841,584

(22) Filed: Mar. 15, 2013

(65) Prior Publication Data

US 2014/0267259 A1    Sep. 18, 2014

(51) Int. Cl.
*G06T 15/00* (2011.01)
*G06T 17/20* (2006.01)

(52) U.S. Cl.
CPC .................................. *G06T 15/005* (2013.01)

(58) Field of Classification Search
None
See application file for complete search history.

(56) References Cited

U.S. PATENT DOCUMENTS

| | | | |
|---|---|---|---|
| 6,246,415 B1 | 6/2001 | Grossman et al. | |
| 6,525,726 B1 | 2/2003 | Xie et al. | |
| 6,697,063 B1 | 2/2004 | Zhu | |
| 9,117,309 B1 * | 8/2015 | Crow | G06T 11/203 |
| 2004/0196285 A1 * | 10/2004 | Rice | G06T 17/20 345/423 |
| 2010/0060630 A1 * | 3/2010 | Nystad et al. | 345/419 |
| 2011/0018874 A1 * | 1/2011 | Hasselgren et al. | 345/420 |
| 2011/0080406 A1 | 4/2011 | Hakura et al. | |
| 2012/0206447 A1 * | 8/2012 | Hutchins | 345/419 |
| 2012/0229464 A1 * | 9/2012 | Fishwick | 345/423 |

OTHER PUBLICATIONS

Segal et al., "The OpenGL Graphics System: A Specification (Version 4.3 (Core Profile)—Aug. 6, 2012)," The Khronos Group Inc., Aug. 6, 2012, 742 pp.

* cited by examiner

*Primary Examiner* — James A Thompson
(74) *Attorney, Agent, or Firm* — Shumaker & Sieffert, P.A.

(57) ABSTRACT

This disclosure describes techniques for using bounding regions to perform tile-based rendering with a graphics processing unit (GPU) that supports an on-chip, tessellation-enabled graphics rendering pipeline. Instead of generating binning data based on rasterized versions of the actual primitives to be rendered, the techniques of this disclosure may generate binning data based on a bounding region that encompasses one or more of the primitives to be rendered. Moreover, the binning data may be generated based on data that is generated by at least one tessellation processing stage of an on-chip, tessellation-enabled graphics rendering pipeline that is implemented by the GPU. The techniques of this disclosure may, in some examples, be used to improve the performance of an on-chip, tessellation-enabled GPU when performing tile-based rendering without sacrificing the quality of the resulting rendered image.

48 Claims, 16 Drawing Sheets

TILE-BASED RENDERING

TECHNICAL FIELD

This disclosure relates to graphics processing systems, and more particularly, to the rendering of graphics primitives in a graphics processing system.

BACKGROUND

Computing devices often utilize a graphics processing unit (GPU) to accelerate the rendering of graphics data for display. Such computing devices may include, e.g., computer workstations, mobile phones (e.g., so-called smartphones), embedded systems, personal computers, tablet computers, and video game consoles. Rendering generally refers to the process of converting a three-dimensional (3D) graphics scene, which may include one or more 3D graphics objects, into two-dimensional (2D) rasterized image data. A GPU may include a 3D rendering pipeline to provide at least partial hardware acceleration for the rendering of a 3D graphics scene. The 3D graphics objects in a scene may be subdivided by a graphics application into one or more 3D graphics primitives (e.g., points, lines, triangles, patches, etc.), and the GPU may convert the 3D graphics primitives of the scene into 2D rasterized image data. Therefore, in the specific context of GPU rendering, rendering may refer to the process of converting 3D graphics primitives that correspond to 3D objects in a graphics scene into 2D rasterized image data.

Rendering typically takes place with respect to a render target (e.g., a frame buffer), which is usually updated as each of the graphics primitives in the scene is rendered. Therefore, not only does the render target store the final 2D rasterized image data for a graphics scene, but the render target may also store intermediate data as the graphics scene is rendered. The 2D rasterized image data stored in the render target may include a plurality of pixels where each of the pixels includes color data, transparency data, and/or depth data. As each new primitive is rendered into the render target, the 2D rasterized image data of the new primitive is merged with the existing intermediate data that has already been stored in the render target for the previously rendered primitives.

To merge the data in the render target, the intermediate data typically needs to be read from the render target prior to writing the new data to the render target. Therefore, rendering may involve the performance of numerous read and write operations with respect to a memory that contains the render target, thereby resulting in high memory bandwidth usage.

SUMMARY

This disclosure is directed to techniques for using bounding regions to perform tile-based rendering with a graphics processing unit (GPU) that supports an on-chip, tessellation-enabled graphics rendering pipeline. Instead of generating binning data based on rasterized versions of the actual primitives to be rendered, the techniques of this disclosure may generate binning data based on a bounding region that encompasses one or more of the primitives to be rendered. Moreover, the binning data may be generated based on data that is generated by at least one tessellation processing stage of an on-chip, tessellation-enabled graphics rendering pipeline that is implemented by the GPU. By using bounding regions and data that is generated by at least one tessellation processing stage of an on-chip, tessellation-enabled graphics rendering pipeline to generate the binning data that is used to perform tile-based rendering, the performance of an on-chip, tessellation-enabled, tile-based rendering GPU may, in some cases, be improved without sacrificing the quality of the resulting rendered image.

In one example, this disclosure describes a method that includes performing, with one or more processors, tile-based rendering for one or more graphics primitives based on a bounding region that encompasses the one or more graphics primitives and based on data that is generated by at least one tessellation processing stage of an on-chip, tessellation-enabled, graphics rendering pipeline that is implemented by a GPU.

In another example, this disclosure describes a device that includes one or more processors configured to perform tile-based rendering for one or more graphics primitives based on a bounding region that encompasses the one or more graphics primitives and based on data that is generated by at least one tessellation processing stage of an on-chip, tessellation-enabled, graphics rendering pipeline that is implemented by the GPU.

In another example, this disclosure describes an apparatus that includes means for receiving data indicative of one or more graphics primitives to be rendered. The apparatus further includes means for performing tile-based rendering for the one or more graphics primitives based on a bounding region that encompasses the one or more graphics primitives and based on data that is generated by at least one tessellation processing stage of an on-chip, tessellation-enabled, graphics rendering pipeline that is implemented by a GPU.

In another example, this disclosure describes a computer-readable storage medium storing instructions that, when executed, cause one or more processors to perform tile-based rendering for one or more graphics primitives based on a bounding region that encompasses the one or more graphics primitives and based on data that is generated by at least one tessellation processing stage of an on-chip, tessellation-enabled, graphics rendering pipeline that is implemented by a GPU.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
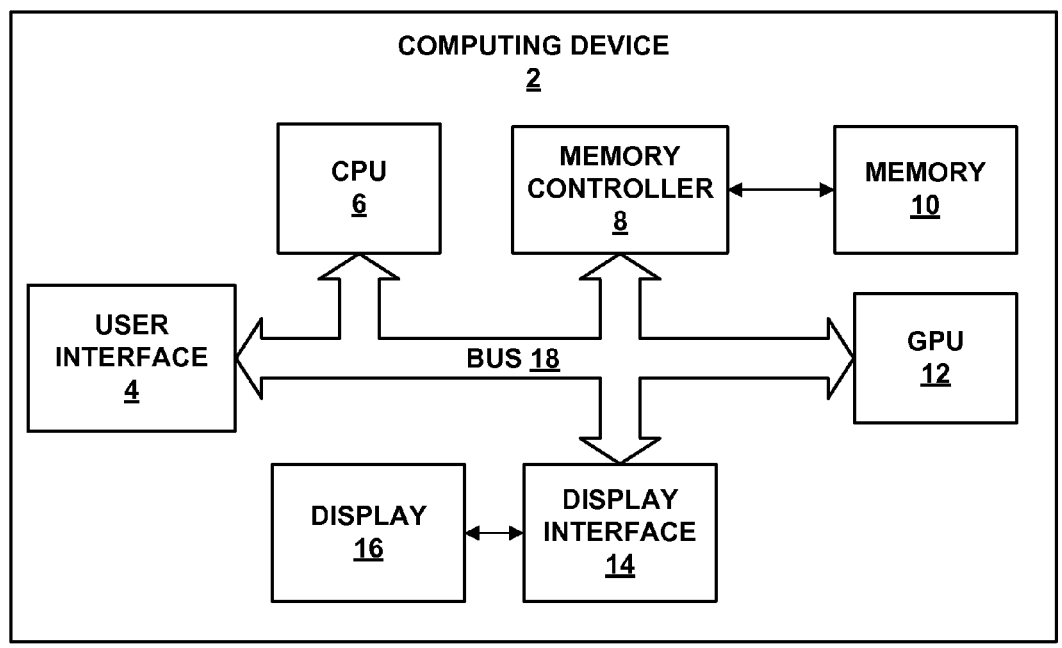
FIG. 1 is a block diagram illustrating an example computing device that may be used to implement the tile-based rendering techniques of this disclosure.

This disclosure is directed to techniques for using bounding regions to perform tile-based rendering with a graphics processing unit (GPU) that supports an on-chip, tessellation-enabled graphics rendering pipeline. Instead of generating binning data based on rasterized versions of the actual primitives to be rendered, the techniques of this disclosure may generate binning data based on a bounding region that encompasses one or more of the primitives to be rendered. Moreover, the binning data may be generated based on data that is generated by at least one tessellation processing stage of an on-chip, tessellation-enabled graphics rendering pipeline that is implemented by the GPU. By using bounding regions and data that is generated by at least one tessellation processing stage of an on-chip, tessellation-enabled graphics rendering pipeline to generate the binning data that is used to perform tile-based rendering, the performance of an on-chip, tessellation-enabled, tile-based rendering GPU may, in some cases, be improved without sacrificing the quality of the resulting rendered image.

Tile-based rendering may, in some examples, involve subdividing a render target into a plurality of sub-regions (e.g., bins or tiles), and performing a separate rendering pass for each of the sub-regions of the render target. To reduce the number of primitives that need to be processed during the rendering passes, a binning pass may, in some examples, be performed prior to the rendering passes. The binning pass may be used to generate binning data that indicates to which of a plurality of sub-regions of a render target each of the primitives to be rendered contributes pixel data. The binning data may be used during the rendering passes to selectively render primitives that contribute to sub-regions that are active during the rendering passes, thereby reducing the number of primitives that need to be processed during the rendering passes.

Each of the primitives to be rendered by a GPU is typically represented by a plurality of vertices, which the GPU processes in a geometry processing pipeline. Each of the vertices that is processed by a GPU typically requires at least one instantiation of the geometry processing pipeline in the GPU. Moreover, if tessellation is used, each vertex may result in multiple instantiations of the tessellation stages and the post-tessellation stages of the geometry processing pipeline. Generating conservative binning data based on a bounding region as opposed to generating binning data based on rasterized versions of the actual primitives to be rendered may reduce the number of vertices that need to be processed in order to generate usable binning data for tile-based rendering. Reducing the number of vertices that need to be processed when generating binning data may reduce the number of instantiations of the geometry pipeline that are needed to generate the binning data. In this way, bounding region-based binning data may be used to reduce the number of instantiations of the geometry pipeline, which in some cases, may improve the performance of a tile-based rendering GPU.

In some examples, the bounding region may be processed by one or more tessellation stages of an on-chip, tessellation-enabled graphics rendering pipeline that is implemented by the GPU to generate tessellation stage-processed data. A rasterized version of the bounding region may be generated based on the tessellation stage-processed data, and the binning data may be generated based on the rasterized version of the bounding region. In such examples, the one or more tessellation stages of the on-chip, tessellation-enabled graphics rendering pipeline that is implemented by the GPU may, in some examples, be configured to perform the same processing and/or transforms for the positional coordinates of the vertices of the bounding region as that which will be performed during the rendering passes for the positional coordinates of the vertices of the actual primitives to be rendered.

Using one or more tessellation stages during the binning pass to process vertex positional coordinates in the same way as such coordinates are to be processed during the rendering passes may ensure that the resulting binning data for the bounding region corresponds, at least conservatively, to binning data that would result from generating the binning data based solely on the actual primitives to be rendered. In other words, using the one or more tessellation stages to generate the binning data ensures that the binning data generated based on the bounding region will include at least all of the bins that would have been included in the binning data had the binning data been generated based solely on the actual primitives to be rendered.

Ensuring that the bounding region-based binning data generated according to the techniques of this disclosure corresponds at least conservatively to primitive-based binning data ensures that the quality of the resulting rendered image is not reduced due to using bounding region-based binning data instead of primitive-based binning data. In this way, bounding region-based binning data may be used to reduce the number of instantiations of the geometry pipeline without requiring a reduction in the resulting quality of the rendered image.

Rendering may refer to the process of converting 3D graphics primitives that correspond to 3D objects in a graphics scene into 2D rasterized image data. Rendering typically takes place with respect to a render target (e.g., a frame buffer), which is usually updated as each of the graphics primitives in the scene is rendered. Therefore, not only does the render target store the final 2D rasterized image data for a graphics scene, but the render target may also store intermediate data as the graphics scene is rendered. The 2D rasterized image data stored in the render target may include a plurality of pixels where each of the pixels includes color data, transparency data, and/or depth data. As each new primitive is rendered into the render target, the 2D rasterized image data of the new primitive is merged with the existing intermediate data that is already stored in the render target for the previously rendered primitives.

To merge the data in the render target, the intermediate data typically needs to be read from the render target prior to writing the new data to the render target. Therefore, rendering may involve the performance of numerous read and write operations with respect to a memory that contains the render target, thereby resulting in high memory bandwidth usage. Because of the high memory bandwidth usage, it is desirable to use a dedicated, high-bandwidth, on-chip memory for the render target. However, in area-limited applications, such as, e.g., mobile applications, there may not be enough available area to implement a high-bandwidth, on-chip memory that is able to simultaneously hold all of the data for each of the pixels in the render target.

Tile-based rendering may address the above-mentioned issues by subdividing a render target into a plurality of sub-regions (e.g., tiles or bins), and performing a separate rendering pass for each of the sub-regions. Each of the sub-regions may correspond to a subset of the pixels in the render target (e.g., a 16×16 tile of pixels). During each of the rendering passes, all of the image data associated with the corresponding sub-region may be rendered, which may include rendering each of the primitives that contributes pixel data to the sub-region. A high-bandwidth, on-chip memory that is large enough to store the data for a single sub-region of the render target may be used as a local render target for each of rendering passes, and after a rendering pass has completed, the contents of the local render target for the rendering pass may be transferred to the general render target stored in a low-bandwidth, off-chip system memory. By performing separate rendering passes on a per-tile basis, tile-based rendering schemes may be able to allow a high-bandwidth, on-chip memory to be used for merging rasterized image data even in area-limited applications that do not allow for large on-chip memories.

One approach for performing tile-based rendering is to perform a rendering pass for each of the sub-regions of the render target, and during each of the rendering passes, render all of the primitives in the scene while using different scissors settings to limit the output to a particular sub-region that is currently being rendered. Such an approach, however, may be inefficient because each of the primitives is rendered in each of the rendering passes regardless of whether or not the primitive is actually visible in the rendered sub-region.

In order to improve the efficiency of tile-based rendering, a binning pass may be performed prior to the performance of the rendering passes. The binning pass may be used to determine binning data for the primitives. For each of the primitives to be rendered, the binning data may indicate with respect to which of the sub-regions of the render target each of the primitives contribute pixel data. For example, if two primitives are to be rendered, the binning data may indicate that a first primitive contributes pixel data to sub-regions 1, 2, 6, 7, 8 and 12 of a render target, and that a second primitive contributes pixel data to sub-regions 7, 8, 12 and 13 of the render target.

In some examples, the binning data may be generated based on a composite of the rasterized versions of each of the primitives to be rendered to the render target. In some cases, conservative z-testing and/or other culling techniques may be used to generate the rasterized versions of each of the primitives. Conservative z-testing and/or other culling techniques may remove occluded primitives (i.e., primitives that are located behind other primitives) from being included in the list of primitives that are said to contribute to a particular tile.

During the rendering pass for a particular sub-region, the binning data may be used to select primitives to be rendered that actually contribute image data (e.g., pixel data) to the sub-region, and to bypass rendering primitives that do not contribute image data to the sub-region. In this way, the number of primitives that need to be processed during a given rendering pass may, in some cases, be reduced.

Although the binning pass described above may reduce the total number of primitives that are processed during the rendering passes, additional processing overhead may be added due to the additional vertex and geometry processing that occurs during the binning pass. For example, when generating binning data based on the actual primitives to be rendered, each of the vertices for each of the primitives received by the GPU may need to be processed once during the binning pass and again during one or more rendering passes that correspond to the sub-regions in which the primitive is visible. Specifically, with respect to the Microsoft® DirectX 11 graphics pipeline, the vertex processing that occurs during the binning pass may involve processing each of the vertices using the vertex shader, the hull shader, the tessellator, the domain shader and the geometry shader.

If tessellation is used, then each of the primitives received by the GPU may tessellate into numerous additional primitives, which may further increase the number of vertices that are processed during the binning pass. For example, for highly-tessellated objects, numerous instantiations of the domain shader and geometry shader may need to occur to generate the binning data.

This disclosure describes techniques for reducing the number of vertices that are processed during a binning pass when performing tile-based rendering. For example, during the binning pass, instead of generating binning data for the primitives to be rendered based on rasterized versions of the actual primitives to be rendered, the techniques of this disclosure may generate binning data based on a bounding region that encompasses the primitives to be rendered. For example, the bounding region may encompass all primitives associated with a 3D object to be rendered. As another example, the bounding region may encompass all tessellated primitives that are generated from a single input primitive (e.g., a complex hull of a higher-order surface).

During the rendering passes, the primitives effectively inherit the binning data from the bounding region of which they are a part. The bounding region for a plurality of primitives may have fewer vertices than the total number of vertices associated with the primitives to be rendered, especially in cases where the primitives are tessellated. Therefore, by using the bounding region to generate visibility data for the plurality of primitives contained within the bounding region, the techniques of this disclosure may reduce the number of vertices that need to be processed during a binning pass to generate binning data.

In some examples, the bounding region for the primitives to be rendered may be provided to the GPU by a graphics application that issued the draw call instruction (i.e., an instruction to render one or more primitives) associated with the primitives to be rendered. The graphics application may execute on a host processor that is communicatively coupled to the GPU. Certain types of graphics applications (e.g., 3D gaming applications) may use bounding regions for various objects to execute collision detection algorithms. In such cases, the bounding region provided by the graphics application to the GPU may, in some examples, correspond to the bounding region that is used for performing a collision detection algorithm. A collision detection algorithm may refer to an algorithm that detects when two different objects in a graphics scene intersect with each other. In further examples, the bounding region may correspond to a bounding region that is used by the graphics application for clipping purposes. In general, a graphics application may specify any bounding region for one or more primitives to be rendered, and provide the bounding region to the GPU via one or more application programming interface (API) calls. By using a bounding region that is already used by a graphics application for other purposes to generate binning data that is to be used when perform tile-based rendering, the benefits of performing tile-based rendering based on bounding regions may be achieved without requiring extra processing to be performed at render time in order to generate a bounding region at render time.

In additional examples, the bounding region for the primitives to be rendered may be generated by a graphics driver that services a draw call instruction and/or by a GPU that executes the draw call instruction. For example, in response to receiving a draw call instruction that instructs the GPU to render one or more primitives, the graphics driver and/or the GPU may generate a bounding region for the primitives to be rendered based on positional coordinates associated with the vertices of the primitives to be rendered. As another example, in response to receiving a draw call instruction that instructs the GPU to render a higher-order surface (e.g., a Bézier surface), the graphics driver and/or the GPU may generate a convex hull that encompasses the higher-order surface based on the control points for the surface.

The bounding region may be any shape, including, e.g., a sphere, an ellipsoid, a rectangular prism or any other shape or volume that encompasses the primitives to be rendered. A bounding region may be said to encompass the primitives to be rendered in the sense that each of the primitives to be rendered may be located in the interior of the bounding region in a specified coordinate space. In some examples, the specified coordinate space may be a pre-transformed coordinate space (e.g., model space, world space, etc.). During the binning pass, the GPU may transform the coordinates for the bounding box from the pre-transformed coordinate space to a transformed coordinate space (e.g., screen space coordinates), and determine to which tiles the bounding region contributes pixel data based on the transformed coordinates for the bounding region.

The GPU may generate the binning data for the bounding region based on the determination of the sub-regions of the render target to which the bounding region contributes pixel data. The bounding region may contribute image data to a particular sub-region of a render target if the rasterized version of the bounding region includes pixels that are located with that particular sub-region of the render target.

The GPU may perform a rendering pass for each of the sub-regions of the render target based on the binning data generated from the bounding region. For example, for each of a plurality of rendering passes, the GPU may determine whether to render a plurality of primitives associated with the bounding region during the respective rendering pass based on the binning data. If the binning data indicates that the bounding region contributes pixel data to a sub-region associated with a respective rendering pass, then the GPU may render one or more primitives during the rendering pass into the sub-region associated with the respective rendering pass. On the other hand, if the binning indicates that the bounding region does not contribute pixel data to the sub-region associated with the respective rendering pass, then the GPU may not render the plurality of primitives into the sub-region associated with the respective rendering pass.

FIG. 1 is a block diagram illustrating an example computing device 2 that may be used to implement the tile-based rendering techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user interface 4, a CPU 6, a memory controller 8, a memory 10, a graphics processing unit (GPU) 12, a display interface 14, a display 16 and a bus 18. User interface 4, CPU 6, memory controller 8, GPU 12 and display interface 14 may communicate with each other using bus 18. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, a graphics application, a word processor application, an email application, a spread sheet application, a media player application, a video game application, a graphical user interface application, an operating system, or any other type of program. The user may provide input to computing device 2 via one or more input devices (not shown) such as a keyboard, a mouse, a microphone, a touch pad or another input device that is coupled to computing device 2 via user interface 4.

The software applications that execute on CPU 6 may include one or more graphics rendering instructions that instruct GPU 12 to render graphics data to a frame buffer for display on display 16. In some examples, the graphics rendering instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadrilaterals, triangle strips, etc.

Memory controller 8 facilitates the transfer of data going into and out of memory 10. For example, memory controller 8 may receive memory read and write commands, and service such commands with respect to memory system 10 in order to provide memory services for the components in computing device 2. Memory controller 8 is communicatively coupled to memory 10. Although memory controller 8 is illustrated in the example computing device 2 of FIG. 1 as being a processing module that is separate from both CPU 6 and memory 10, in other examples, some or all of the functionality of memory controller 8 may be implemented on one or both of CPU 6 and memory 10.

Memory 10 may store program modules and/or instructions that are accessible for execution by CPU 6 and/or data for use by the programs executing on CPU 6. For example, memory 10 may store program code and graphics data associated with the applications executing on CPU 6. Memory 10 may additionally store information for use by and/or generated by other components of computing device 2. For example, memory 10 may act as a device memory for GPU 12 and may store data to be operated on by GPU 12 as well as data resulting from operations performed by GPU 12. For example, memory 10 may store any combination of texture buffers, depth buffers, stencil buffers, vertex buffers, frame buffers, render targets, or the like. In addition, memory 10 may store command streams for processing by GPU 12. Memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data medium or an optical storage medium.

GPU 12 may be configured to execute commands that are issued to GPU 12 by CPU 6. The commands executed by GPU 12 may include graphics commands, draw call commands, GPU state programming commands, memory transfer commands, general-purpose computing commands, kernel execution commands, etc.

In some examples, GPU 12 may be configured to perform graphics operations to render one or more graphics primitives to display 18. In such examples, when one of the software applications executing on CPU 6 requires graphics processing, CPU 6 may provide graphics data to GPU 12 for rendering to display 18 and issue one or more graphics commands to GPU 12. The graphics commands may include, e.g., draw call commands, GPU state programming commands, memory transfer commands, blitting commands, etc. The graphics data may include vertex buffers, texture data, surface data, etc. In some examples, CPU 6 may provide the commands and graphics data to GPU 12 by writing the commands and graphics data to memory 10, which may be accessed by GPU 12.

In further examples, GPU 12 may be configured to perform general-purpose computing for applications executing on CPU 6. In such examples, when one of the software applications executing on CPU 6 decides to off-load a computational task to GPU 12, CPU 6 may provide general-purpose computing data to GPU 12, and issue one or more general-purpose computing commands to GPU 12. The general-purpose computing commands may include, e.g., kernel execution commands, memory transfer commands, etc. In some examples, CPU 6 may provide the commands and general-purpose computing data to GPU 12 by writing the commands and graphics data to memory 10, which may be accessed by GPU 12.

GPU 12 may, in some instances, be built with a highly-parallel structure that provides more efficient processing of vector operations than CPU 6. For example, GPU 12 may include a plurality of processing elements that are configured to operate on multiple vertices, control points, pixels and/or other data in a parallel manner. The highly parallel nature of GPU 12 may, in some instances, allow GPU 12 to render graphics images (e.g., GUIs and two-dimensional (2D) and/or three-dimensional (3D) graphics scenes) onto display 16 more quickly than rendering the images using CPU 6. In addition, the highly parallel nature of GPU 12 may allow GPU 12 to process certain types of vector and matrix operations for general-purpose computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In some examples, GPU 12 may include a GPU cache, which may provide caching services for all or a portion of memory 10. In such examples, GPU 12 may use the cache to process data locally using a local storage, instead of off-chip memory. This allows GPU 12 to operate in a more efficient manner by reducing the need for GPU 12 to access memory 10 via bus 18, which may experience heavy bus traffic, during each read and write command. In some examples, however, GPU 12 may not include a separate cache, but instead utilize memory 10 via bus 18. The GPU cache may include one or more volatile or non-volatile memories or storage devices, such as, e.g., random access memory (RAM), static RAM (SRAM), dynamic RAM (DRAM), etc.

CPU 6 and/or GPU 12 may store rasterized image data in a frame buffer that is allocated within memory 10. Display interface 14 may retrieve the data from the frame buffer and configure display 16 to display the image represented by the rasterized image data. In some examples, display interface 14 may include a digital-to-analog converter (DAC) that is configured to convert the digital values retrieved from the frame buffer into an analog signal consumable by display 16. In other examples, display interface 14 may pass the digital values directly to display 16 for processing.

Display 16 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 16 may be integrated within computing device 2. For instance, display 16 may be a screen of a mobile telephone handset or a tablet computer. Alternatively, display 16 may be a stand-alone device coupled to computer device 2 via a wired or wireless communications link. For instance, display 16 may be a computer monitor or flat panel display connected to a personal computer via a cable or wireless link.

Bus 18 may be implemented using any combination of bus structures and bus protocols including first, second and third generation bus structures and protocols, shared bus structures and protocols, point-to-point bus structures and protocols, unidirectional bus structures and protocols, and bidirectional bus structures and protocols. Examples of different bus structures and protocols that may be used to implement bus 18 include, e.g., a HyperTransport bus, an InfiniBand bus, an Advanced Graphics Port bus, a Peripheral Component Interconnect (PCI) bus, a PCI Express bus, an Advanced Microcontroller Bus Architecture (AMBA)

Advanced High-performance Bus (AHB), an AMBA Advanced Peripheral Bus (APB), and an AMBA Advanced eXentisible Interface (AXI) bus. Other types of bus structures and protocols may also be used.

According to this disclosure, computing device 2 (e.g., CPU 6 and/or GPU 12) may be configured to perform tile-based rendering for one or more graphics primitives based on a bounding region that encompasses the one or more graphics primitives and based on data that is generated by at least one tessellation processing stage of an on-chip, tessellation-enabled, graphics rendering pipeline that is implemented by GPU 12. By using bounding regions and data that is generated by at least one tessellation processing stage of an on-chip, tessellation-enabled graphics rendering pipeline to generate the binning data that is used to perform tile-based rendering, the performance of an on-chip, tessellation-enabled, tile-based rendering GPU may, in some cases, be improved without sacrificing the quality of the resulting rendered image.

Tile-based rendering may, in some examples, involve subdividing a render target into a plurality of sub-regions (e.g., bins or tiles), and performing a separate rendering pass for each of the sub-regions of the render target. To reduce the number of primitives that need to be processed during the rendering passes, a binning pass may, in some examples, be performed prior to the rendering passes. The binning pass may be used to generate binning data that indicates to which of a plurality of sub-regions of a render target each of the primitives to be rendered contributes pixel data. The binning data may be used during the rendering passes to selectively render primitives that contribute to sub-regions that are active during the rendering passes, thereby reducing the number of primitives that need to be processed during the rendering passes.

In some examples, to perform tile-based rendering based on a bounding region, an application executing on CPU 6 may place data indicative of one or more primitives to be rendered into memory 10, place data indicative of a bounding region that encompasses the one or more primitives into memory 10, and issue a draw call instruction. A graphics driver executing on CPU 6 may process the draw call instruction, and cause GPU 12 to perform a binning pass based on the bounding region stored in memory 10. During the binning pass, GPU 12 may generate a rasterized version of the bounding region. CPU 6 and/or GPU 12 may generate binning data based on the rasterized version of the bounding region. The binning data may indicate to which of a plurality of sub-regions of a render target the bounding region contributes pixel data. Once the binning pass is complete and the binning data has been generated, CPU 6 may cause GPU 12 to perform a plurality of rendering passes based on the binning data.

To perform the binning pass, GPU 12 may, in some examples, implement an on-chip, tessellation-enabled graphics rendering pipeline, and process the bounding region by using one or more tessellation processing stages of the on-chip, tessellation-enabled graphics pipeline to generate tessellation stage-processed data. In such examples, GPU 12 may rasterize the bounding region based on the tessellation stage-processed data to generate a rasterized version of the bounding region. In some examples, the one or more tessellation processing stages may correspond to one or both of a hull shader processing stage and a domain shader processing stage.

A rasterized version of a primitive or a bounding region may, in some examples, refer to a version of a geometrically-defined primitive or a geometrically-defined bounding region that is sampled at regularly-spaced sampling locations or pixels. In contrast, a geometrically-defined primitive or bounding region may refer to a primitive or bounding region that is primarily defined by vertices (or control points) and corresponding vertex attributes. A geometrically-defined primitive may also be defined by a primitive type, a primitive topology, one or more mathematical functions, and/or one or more tessellation techniques.

In some examples, the rasterized version of the bounding region used to generate the binning data may be a low-resolution, rasterized version of the bounding region. A low-resolution, rasterized version of a bounding region may refer to a rasterized version of the bounding region that is rasterized at a resolution that is lower than the resolution at which the one or more primitives encompassed by the bounding region are to be rendered during the rendering passes. The resolution of a rasterized primitive or bounding region may refer to the density of sampling locations and/or pixels that are used to rasterize the primitive or bounding region.

In some examples, in order to generate the rasterized version of the primitive or the bounding region, the rasterizer in GPU 12 may be configured to perform low-resolution z-buffering and/or back-face culling on the primitive or bounding region to be rasterized. In such examples, the rasterized version of the primitive or bounding region may include a sampled subset of the entire geometrically-defined primitive and/or bounding region that is visible after z-buffering and/or back-face culling. Binning data generated from rasterized versions of z-buffered and/or back-faced culled primitives may be referred to herein as visibility data.

To generate the binning data, CPU 6 and/or GPU 12 may determine to which of a plurality of sub-regions of a render target the rasterized version of the bounding region contributes pixel data. In some examples, a bounding region may contribute image data to a particular sub-region of a render target if the rasterized version of the bounding region includes pixels that are located in the particular sub-region of the render target, and may not contribute image data to the particular sub-region of the render target if the rasterized version of the bounding region does not include any pixels that are located in the particular sub-region of the render target. The binning data may be stored, in some examples, in memory 10 or in a cache of GPU 12.

To perform the plurality of rendering passes based on the binning data, GPU 12 may, in some examples, perform a rendering pass for each of the sub-regions of the render target. For each of the individual rendering passes, CPU 6 and/or GPU 12 may generate modified primitive data based on data indicative of the primitives to be rendered, the binning data, and the sub-region of the render target associated with the rendering pass. The modified primitive data may include primitive data for primitives that contribute image data to the sub-region of the render target associated with the rendering pass, and may not include primitive data for at least some primitives that do not contribute image data to the sub-region of the render target associated with the rendering pass.

To generate the modified primitive data for a particular rendering pass, CPU 6 and/or GPU 12 may, in some examples, selectively discard primitive data that was received as part of a draw call based on the binning data and based on the sub-region of the render target associated with the rendering pass. For example, CPU 6 and/or GPU 12 may, based on the binning data, discard primitive data for primitives that do not contribute image data to the sub-region of the render target associated with the rendering pass, and retain primitive data for primitives that do contribute image data to the sub-region of the render target associated with the rendering pass. In some examples, the primitive data may correspond to the vertices (e.g., vertex data structures) of the primitives to be rendered during a draw call.

In examples where CPU 6 generates the modified primitive data, for each of the rendering passes, CPU 6 may place the modified primitive data for a particular rendering pass into memory 10, and issue a draw call command to GPU 12 to render the modified primitive data associated with the particular rendering pass. During each of the rendering passes, GPU 12 may access modified primitive data for the particular rendering pass from memory 10, and render the primitives included in the modified primitive data. In this way, CPU 6 may cause GPU 12 to perform a plurality of rendering passes based on the binning data.

In examples where GPU 12 generates the modified primitive data for the rendering passes, CPU 6 may place primitive data indicative of all of the primitives to be rendered during the plurality of rendering passes into memory 10, and issue a draw call command to GPU 12 for each of the rendering passes. For each of the rendering passes, CPU 6 may provide GPU 12 with data indicating with respect to which sub-region of a render target a particular draw call should rendered. During each of the rendering passes, GPU 12 may access the primitive data from memory 10, generate modified primitive data based on the binning data and based on the data that indicates with respect to which sub-region of a render target a particular draw call should rendered, and render the primitives included in the modified primitive data. In this way, CPU 6 may cause GPU 12 to perform a plurality of rendering passes based on the binning data.

In further examples where GPU 12 generates the modified primitive data for the rendering passes, instead of CPU 6 issuing multiple draw calls to GPU 12, CPU 6 may place primitive data indicative of all of the primitives to be rendered during the plurality of rendering passes into memory 10, and issue a single draw call command to GPU 12. In such examples, GPU 12 may automatically perform a plurality of rendering passes and cycle through each of the sub-regions to be rendered in response to receiving the single draw call command. In this way, CPU 6 may cause GPU 12 to perform a plurality of rendering passes based on the binning data.

To perform the rendering passes, GPU 12 may, in some examples, implement an on-chip, tessellation-enabled graphics pipeline that includes one or more tessellation processing stages. In such examples, for each of the primitives to be rendered during a given rendering pass, GPU 12 may tessellate the respective primitive using the one or more tessellation processing stages of the on-chip, tessellation-enabled graphics pipeline to generate a plurality of tessellated primitives, and rasterize each of the tessellated primitives to generate a rasterized version of the respective primitive to be rendered. In some examples, the one or more tessellation processing stages may correspond to one or both of a hull shader processing stage and a domain shader processing stage.

In examples where both the binning pass and the rendering passes use the same one or more tessellation processing stages to process either bounding region data or primitive data, the tessellation stages may, in some examples, be configured to process positional attributes of vertices during the binning pass in the same manner as positional attributes of vertices are processed during the rendering passes. In other words, the positional attribute processing performed during the binning pass may be the same as the positional attribute processing performed during the rendering passes.

Using one or more tessellation stages during the binning pass to process vertex positional coordinates in the same way as such coordinates are to be processed during the rendering passes may ensure that the resulting binning data for the bounding region corresponds, at least conservatively, to binning data that would result from generating the binning data based solely on the actual primitives to be rendered. In other words, using the one or more tessellation stages to generate the binning data ensures that the binning data generated based on the bounding region will include at least all of the bins that would have been included in the binning data had the binning data been generated based solely on the actual primitives to be rendered.

Ensuring that the bounding region-based binning data generated according to the techniques of this disclosure corresponds at least conservatively to primitive-based binning data ensures that the quality of the resulting rendered image is not reduced due to using bounding region-based binning data instead of primitive-based binning data. In this way, bounding region-based binning data may be used to reduce the number of instantiations of the geometry pipeline without requiring any reduction in the resulting quality of the rendered image.

In examples where the positional attribute processing performed by the one or more tessellation stages during the binning pass is the same as the positional attribute processing performed by the one or more tessellation stages during the rendering passes, the one or more tessellation processing stages may, in some examples, be configured to process positional attributes and other attributes of vertices during the rendering passes, and to process positional attributes of vertices without processing the other attributes of the vertices during the binning pass. Because the bounding region is not actually rendered to the display in such examples, and because the information contained in the positional attributes of the vertices for the bounding region may be sufficient to generate conservative binning data in such examples, the processing of attributes other than positional attributes for the bounding region may be omitted without affecting the resulting quality of the rendering passes. By omitting the processing of attributes other than the positional attributes during the binning pass in such examples, the processing resources consumed by the binning pass may be reduced relative to cases where all vertex attributes are processed during the binning pass regardless of whether such attributes contribute to the resulting binning data.

In contrast to other techniques for tile-based rendering that may generate binning data based on rasterized versions of the actual primitives to be rendered, CPU 6 and/or GPU 12 may generate binning data based on a bounding region that encompasses one or more of the primitives to be rendered. Moreover, CPU 6 and/or GPU 12 may generate the binning data based on data that is generated by at least one tessellation processing stage of an on-chip, tessellation-enabled graphics rendering pipeline that is implemented by the GPU. By using bounding regions and data that is generated by at least one tessellation processing stage of an on-chip, tessellation-enabled graphics rendering pipeline to generate binning data, the number of vertices processed during the binning pass may, in some cases, be reduced, thereby improving the performance of computing device 2 when performing tile-based rendering without sacrificing the quality of the resulting rendered image.

Figure 2:
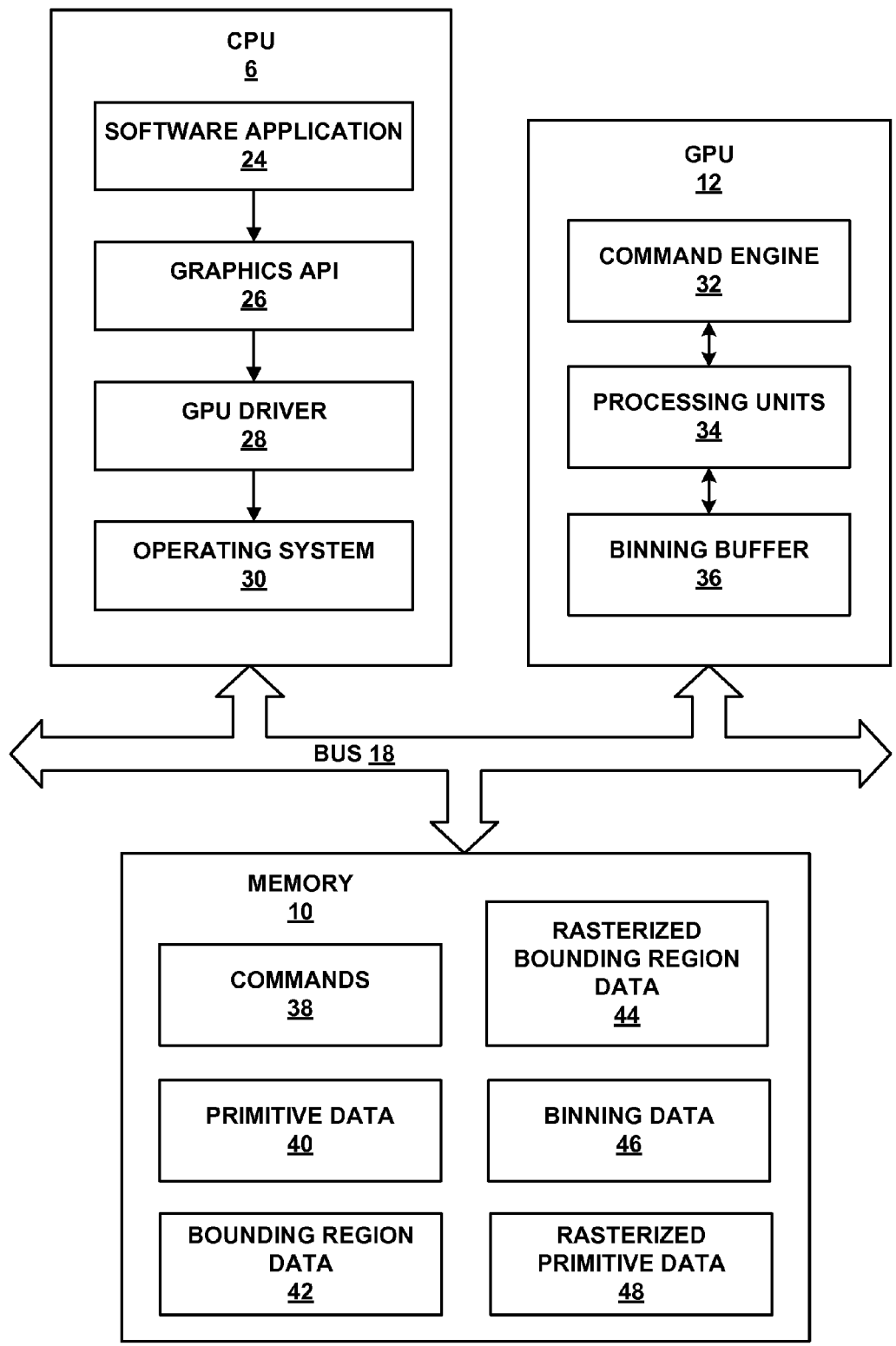
FIG. 2 is a block diagram illustrating the CPU, the GPU and the memory of the computing device shown in FIG. 1 in further detail.

FIG. 2 is a block diagram illustrating CPU 6, GPU 12 and memory 10 of computing device 2 in FIG. 1 in further detail.

As shown in FIG. 2, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6 forming a system on a chip (SoC).

CPU 6 is configured to execute a software application 24, a graphics API 26, a GPU driver 28 and an operating system 30. CPU 6 may include one or more processors (e.g., microprocessors) that are configured to execute any of software application 24, a graphics API 26, a GPU driver 28 and an operating system 30. In some examples, CPU 6 may be configured to execute instructions that cause the one or more processors of CPU 6 to perform all or part of any of the techniques described in this disclosure.

GPU 12 includes a command engine 32, one or more processing units 34, and a binning buffer 36. The one or more processing units 34 may be configured to form a 3D graphics rendering pipeline. For example, one or more of processing units 34 may implement an on-chip, tessellation-enabled graphics rendering pipeline as described in this disclosure. Command engine 32 and processing units 34 may include any combination of dedicated hardware units, firmware, software, and processors that are configured to perform the functions attributed to such components. In some examples, GPU 12 may be configured to execute instructions that cause one or more processors of GPU 12 to perform all or part of any of the techniques described in this disclosure.

Memory 10 may store one or more commands 38, primitive data 40, bounding region data 42, rasterized bounding region data 44, binning data 46, and rasterized primitive data 48. In some examples, memory 10 may also store instructions that, when executed, cause one or more processors to perform all or part of any of the techniques described in this disclosure.

Software application 24 may be a graphics application that uses GPU 12 to render one or more 3D graphics scenes and/or 3D graphics objects into an image to be displayed on a display. Software application 24 may include instructions that cause GPU 12 to rasterize and render a set of 3D graphics primitives. Software application 24 may issue the instructions to GPU driver 28 via graphics API 26. Graphics API 26 may be a runtime service that translates the instructions received from software application 24 into a format that is consumable by GPU driver 28.

GPU driver 28 receives the instructions from software application 24, via graphics API 26, and controls the operation of GPU 12 to service the instructions. For example, GPU driver 28 may formulate one or more commands 38, place the commands 38 into memory 10, and instruct GPU 12 to execute the commands 38. In some examples, GPU driver 28 may place the commands 38 into memory 10 and communicate with GPU 12 via operating system 30, e.g., via one or more system calls.

Operating system 30 may provide a software platform upon which software application 24, graphics API 26, and GPU driver 28 execute. Operating system 30 may manage the hardware details of communicating and transferring data between CPU 6, memory 10 and GPU 12. In general, CPU 6 may be formed from one or more processors (microprocessors).

Commands 38 may include one or more state commands and/or one or more draw call commands. A state command may instruct GPU 12 to change one or more of the state variables in GPU 12, such as, e.g., the primitive type. A draw call command may instruct GPU 12 to render the geometry defined by a group of one or more vertices (e.g., defined in a vertex buffer) stored in memory 10. The geometry defined by the group of one or more vertices may, in some examples, correspond to a plurality of primitives to be rendered (e.g., primitive data 40) and/or to a bounding region (e.g., bounding region data 42). In general, the draw call command may invoke GPU 12 to render all of the vertices stored in a defined section (e.g., buffer) of memory 10. In other words, once the GPU 12 receives the draw call command, control is passed to GPU 12 for rendering the geometry and primitives represented by the vertices in the defined section (e.g., buffer) of memory 10.

Command engine 32 is configured to retrieve and execute commands 38 stored in memory 10. Command engine 32 may manage the rendering state of GPU 12, control the operation of processing units 34 such that processing units 34 implement a graphics rendering pipeline, and cause graphics data to be rendered into a render target via the graphics rendering pipeline.

In response to receiving a state command, command engine 32 may be configured to set one or more state registers in GPU to particular values based on the state command, and/or to configure one or more of the fixed-function processing units 34 based on the state command. In response to receiving a draw call command, command engine 32 may be configured to cause processing units 34 to render the geometry represented by vertices in memory 10 (e.g., the geometry represented by primitive data 40 and/or by bounding region data 42). Command engine 32 may also receive shader program binding commands, and load particular shader programs into one or more of the programmable processing units 34 based on the shader program binding commands.

Processing units 34 may include one or more processing units, each of which may be a programmable processing unit or a fixed-function processing unit. A programmable processing unit may include, for example, a programmable shader unit that is configured to execute one or more shader programs that are downloaded onto GPU 12 from CPU 6. A shader program, in some examples, may be a compiled version of a program written in a high-level shading language, such as, e.g., an OpenGL Shading Language (GLSL), a High Level Shading Language (HLSL), a C for Graphics (Cg) shading language, etc.

A programmable shader unit may, in some examples, include a plurality of processing units that are configured to operate in parallel, e.g., a single instruction multiple data (SIMD) pipeline. A programmable shader unit may have a program memory that stores shader program instructions and an execution state register, e.g., a program counter register that indicates the current instruction in the program memory being executed or the next instruction to be fetched. The programmable shader units in processing units 34 may include, for example, vertex shader units, pixel shader units, geometry shader units, hull shader units, domain shader units, compute shader units, and/or unified shader units.

A fixed-function processing unit may include hardware that is hard-wired to perform certain functions. Although the fixed-function hardware may be configurable, via one or more control signals, for example, to perform different functions, the fixed-function hardware typically does not include a program memory that is capable of receiving user-compiled programs. In some examples, the fixed-function processing units in processing units 34 may include, for example, processing units that perform raster operations, such as, e.g., depth testing, scissors testing, alpha blending, etc.

Binning buffer 36 may be configured to store rasterized data for a sub-region of a render target. Binning buffer 36 may act as a temporary render target for a particular sub-region of the actual render target during the performance of a rendering pass. Binning buffer 36 may include one or more volatile or non-volatile memories or storage devices, such as, e.g., random access memory (RAM), static RAM (SRAM), dynamic RAM (DRAM), etc. In some examples, binning buffer 36 may be an on-chip buffer. An on-chip buffer may refer to a buffer that is formed on, located on, and/or disposed on a microchip, an integrated circuit, and/or a die that is the same as the microchip, integrated circuit, and/or die upon which GPU is formed, located, and/or disposed.

In some examples, processing units 34 may access binning buffer 36 via a first communication interface, and access the render target (e.g., a frame buffer stored in memory 10) via a second communication interface that is different than the first communication interface. In such examples, the first communication interface may have, in some examples, a higher bandwidth than the second communication interface. The second communication interface may, in some examples, correspond to bus 18 in FIG. 1 and the connection between memory controller 8 and memory 10 in FIG. 1. When the bin buffer is an on-chip bin buffer, the first communication interface may be a communication interface that is internal to GPU 12.

As used herein, bandwidth may refer to the rate at which a communication interface is capable of transferring data between two components, e.g., a memory component and GPU 12. The units for bandwidth may, in some examples, be given as a number of bits per unit of time, e.g., gigabits per second (Gb/s). When a bus having a bus width of multiple bits is used as part of the communication interface, the bandwidth may, in some examples, be equal to the product of the width of the bus multiplied by the rate at which data is transferred along a single bit line. For example, if a bus is 16 bits wide, and each bit line of the bus is capable of transferring data at a rate of 2 Gb/s, the bandwidth of the bus may be equal to 32 Gb/s. If multiple buses form a communication interface between two components, then the bandwidth of the communication interface may be a function of the bandwidth of each of multiple buses, e.g., the minimum bandwidth of each of the individual buses.

When binning buffer 36 is implemented on the same chip as GPU 12, GPU 12 does not necessarily need to access binning buffer 36 via the system and memory buses (e.g., bus 18 in FIG. 1 and the connection between memory controller 8 and memory 10 in FIG. 1), but rather may access binning buffer 36 via an internal communication interface (e.g., a bus) implemented on the same chip as the GPU 12. Because such an interface is on-chip, it may be capable of operating at a higher bandwidth than the system and memory busses. Although the above described technique is one way of achieving a communication interface for binning buffer 36 that exceeds the bandwidth of the communication interface used to access memory 10, other techniques are possible and within the scope of this disclosure.

The capacity of binning buffer 36 may, in some examples, be limited by the area available on certain types of computing devices, e.g., mobile devices. Moreover, when binning buffer 36 is implemented on the same chip as GPU 12, the amount of area available to implement binning buffer 36 on the same chip may be limited due to the other functionality that is implemented on the chip. In some examples, binning buffer 36 may have a bit density that is lower than the bit density of the render target further limiting the capacity of binning buffer 36. Because of these and/or other factors, the capacity of binning buffer 36 may, in some cases, be less than the size of the render target. Consequently, the capacity of binning buffer 36 may, in such examples, be less than a minimum capacity needed to store pixel data for all of a plurality of destination pixels associated with a graphics image. The capacity of a memory component may refer a maximum amount of data (e.g., a maximum number of bits) capable of being stored in the memory component. The size of the render target may refer to the amount of data (e.g., the number of bits) stored in the memory range allocated to the render target. Bit density may refer to the number of bits that can be stored in a particular amount of area.

As discussed above, when performing tile-based rendering, GPU 12 may render each sub-region of the render target as a separate rendering pass. For example, as part of a single rendering pass for a particular sub-region of a render target (e.g., a particular subset of the destination pixels of the graphics image), GPU 12 may render all or a subset of the primitives with respect to the particular sub-region of the render target. The capacity of binning buffer 36 may be configured to be greater than or equal to the size of the sub-region of the render target. Therefore, during a single rendering pass, all destination pixel data associated with a respective one of the sub-regions of the render target may be available in binning buffer 36 without necessarily needing to access a frame buffer in memory 10. Consequently, during a single rendering pass, GPU 12 may be able to read the destination pixel data from binning buffer 36 via a relatively high bandwidth communication interface rather than having to read such data from memory 10 via a relatively low bandwidth communication interface.

Although some graphics systems that do not perform bin rendering may be capable of caching part of the frame buffer by using a hardware-based, on-chip cache, such caches do not guarantee that the destination pixel values for a given pixel will be available when needed. This is because multiple destination pixels may map to the same address in the hardware-based cache. If tile-based rendering is not used in this case, then the current state of the hardware-based cache may not necessarily include the destination pixel values associated with a currently processed primitive, but rather include destination pixel values associated with previously processed primitives in other areas of the graphics image.

In contrast to a hardware-based cache where multiple destination pixels map to the same cache location, the destination pixels stored in binning buffer 36 for a given rendering pass may, in some examples, be uniquely addressable. In other words, for a given rendering pass, a one-to-one mapping may be defined between the addressable storage slots in binning buffer 36 and the destination pixels used for that rendering pass. Consequently, when performing tile-based rendering, all destination alpha values for a given binning pass may, in some examples, be available from binning buffer 36 via a relatively low bandwidth communication interface. Moreover, unlike the hardware-based cache systems, because of the uniquely addressable data in binning buffer 36, cache misses do not occur, thereby alleviating the need to resort to bandwidth-expensive frame buffer accesses in the event of a cache miss.

A destination pixel may refer to pixel data stored in a render target (e.g., either a frame buffer or a corresponding binning buffer) for a particular pixel location. In contrast, a source pixel may refer to pixel data that has been generated by a rasterization processing unit in processing units 34 and has not yet been stored to and/or merged with a render target. A destination pixel may include composited pixel data from multiple source pixels associated with different primitives.

To perform the tile-based rendering techniques of this disclosure, software application 24 may, in some examples, place primitive data 40 into memory 10 that geometrically defines a set of one or more 3D graphics primitives to be rendered, and issue one or more draw call commands to GPU driver 28 via graphics API 26. The draw call commands may cause the primitives defined by primitive data 40 to be rasterized and rendered by GPU 12 into a render target. The render target may correspond to rasterized primitive data 48 in memory 10.

In some examples, prior to issuing the draw call commands, software application 24 may configure GPU 12 to render a particular type of primitive. For example, software application 24 may issue a state command to GPU 12 that specifies the particular type of primitive to render during a draw call. In additional examples, prior to issuing the draw call commands, software application 24 may configure GPU 12 to use one or more tessellation techniques to render a primitive. For example, software application 24 may cause one or more shader programs that implement the tessellation techniques to execute on one or more shader units of GPU 12 (e.g., a hull shader unit and/or a domain shader unit) during the draw call instruction.

Primitive data 40 may include data indicative of one or more primitives to be rendered. In some cases, primitive data 40 may geometrically define the primitives to be rendered. Geometrically defining a primitive may refer to defining a primitive by a set of vertices (or control points) and corresponding vertex attributes. In some examples, primitive data 40 may take the form of a plurality of vertices, a vertex list, and/or vertex buffer. In further examples, primitive data 40 may take the form a vertex buffer in combination with an index buffer. In such examples, the vertex buffer may define the vertices, and the index buffer may specify which vertices are used to define each of the primitives.

Each of vertices included in primitive data 40 may include one or more attributes, such as, e.g., positional coordinates, normal coordinates, texture coordinates, etc. The vertices may conceptually correspond to the vertices of a geometric primitive (e.g., a point, line, triangle, etc.) and/or to the control points of a higher-order primitive (e.g., a higher-order surface such as a Bézier surface). In some case, each of the vertices may be grouped into groups of one or more vertices, and each of these groups of vertices may correspond to a single primitive.

The shape of the geometrically-defined primitive may be defined, in some examples, by additional data that is not necessarily included in primitive data 40. The additional data may include one or more of a specified primitive type from a set of one or more predetermined primitive types, one or more mathematical functions, and/or one or more tessellation techniques.

In some examples, the specified primitive type may be stored as a rendering state variable in GPU 12 and may be configurable by software application 24. The specified primitive type may, in some cases, define the shape of the resulting rendered primitives (e.g., points, lines, triangles, etc.) and/or the connectivity of the vertices included in primitive data 40 (e.g., triangle strip, triangle fan, etc.). In some examples, the different primitive types may correspond to a set of primitive topologies that the graphics pipeline implemented by processing units 34 is capable of processing. In further examples, the different primitive types may correspond to the set of primitive topologies that are defined by graphics API 26 and are available for use by software application 24.

The one or more mathematical functions and/or the one or more tessellation techniques may be specified in one or more shader programs that are configured to execute on one or more shader units of GPU 12 (e.g., a hull shader unit and/or domain shader unit). The mathematical functions may be used to define primitives that have curved lines and/or curve surfaces. The one or more tessellation techniques may be used to define a primitive by a plurality of tessellated primitives that approximate the shape and/or curvature of an input primitive.

In some examples, software application 24 may place, into memory 10, bounding region data 42 that defines one or more bounding regions to use during the binning passes when performing tile-based rendering. Each of the bounding regions may encompass all or a subset of the primitives defined by primitive data 40. A bounding region may be said to encompass a particular set of primitives if each of the primitives is located in the interior of the bounding region as defined in world space. Bounding region data 42 may include data indicative of one or more primitives that form the one or more bounding regions defined by bounding region data 42. Similar to primitive data 40, bounding region data 42 may include a plurality of vertices, a vertex list, a vertex buffer, and/or an index buffer.

In further examples, software application 24 may not place any bounding region data 40 into memory 10. Instead, upon receipt of a draw call command, GPU driver 28 may generate one or more bounding regions based on primitive data 40, and place bounding region data 42 that is indicative of the bounding regions into memory 10. In additional examples, instead of software application 24 and/or GPU driver 28 placing bounding region data 42 into memory 10, GPU 12 may generate one or more bounding regions based on primitive data 40. In such examples, GPU 12 may not necessarily place data indicative of the bounding regions into memory 10.

In response to receiving a draw call command from software application 24, GPU driver 28 may cause GPU 12 to perform tile-based rendering based on a bounding region (e.g., based on bounding region data 42). For example, GPU driver 28 may cause GPU 12 to perform a binning pass and a plurality of rendering passes. During the binning pass, GPU 12 may generate a rasterized version of the bounding region, which in some examples, may be stored by GPU 12 in memory 10 as rasterized bounding region data 44. CPU 6 and/or GPU 12 may generate binning data based on the rasterized bounding region (e.g., based on rasterized bounding region data 44). Once the binning data has been generated, GPU 12 may perform a plurality of rendering passes based on the binning data and primitive data 40 to generate rasterized primitive data 48.

Rasterized bounding region data 44 may include data indicative of a rasterized version of one or more bounding regions that may be geometrically-defined in bounding region data 42. A rasterized version of a bounding region may, in some examples, refer to a version of a geometrically-defined bounding region that is sampled at regularly-spaced sampling locations or pixels.

In some cases, a bounding region may be geometrically defined by a plurality of primitives. In such cases, the rasterized version of the bounding region may, in some examples, correspond to rasterized versions of the individual primitives that make up the bounding region. In further examples, the rasterized version of the bounding region may correspond to a composite of the rasterized versions of the individual primitives that make up the bounding region. A composite of the rasterized versions of individual primitives may refer to a single render target where rasterized versions of the individual primitives are merged together based on an ordering scheme and/or blending scheme.

In some examples, in order to generate the rasterized version of the bounding region, the rasterizer in GPU 12 may be configured to perform low-resolution z-buffering and/or back-face culling on the primitive or bounding region to be rasterized. In such examples, the rasterized version of the bounding region may correspond to a rasterized version of the primitives that form the bounding region and that are visible after z-buffering and/or back-face culling.

In some cases, the rasterized version of the bounding region may be stored as a plurality of pixels. Each of the pixels may be associated with one or more spatial locations of the render target, and may include one or more attributes indicative of the color of the respective pixel. In some cases, each of the pixels may further include one or more attributes indicative of the transparency of the pixel. In some examples, rasterized bounding region data 44 may store Red, Green, Blue, Alpha (RGBA) attributes for each pixel where the "RGB" components correspond to color values and the "A" component corresponds to an alpha value.

In some examples, the rasterized version of the bounding region may be a low-resolution, rasterized version of the bounding region. In such examples, each of the pixel locations in the low-resolution, rasterized version of the bounding region may correspond to a plurality of pixel locations in the display resolution.

Binning data 46 may store data indicating to which of a plurality of sub-regions of a render target one or more bounding regions contribute image data. In some examples, a bounding region may contribute image data to a particular sub-region of a render target if the rasterized version of the bounding region includes pixels that are located in the particular sub-region of the render target, and may not contribute image data to the particular sub-region of the render target if the rasterized version of the bounding region does not include any pixels that are located in the particular sub-region of the render target.

In some examples, binning data 46 may be indexed by bounding region, which may be referred to herein as bounding region-indexed binning data. In examples where a single bounding region is used for executing a draw call, the bounding region-indexed binning data may include, e.g., a single data entry that indicates the bins (i.e., sub-regions of the render target) to which the single bounding region contributes pixel data. In examples where multiple bounding regions may be used to execute a draw call, the bounding region-indexed binning data may include a data entry for each of the bounding regions where each data entry indicates the bins to which a respective one of the bounding regions contributes pixel data.

In further examples, binning data 46 may be indexed by primitive, which may be referred to herein as primitive-indexed binning data. In such examples, the primitive-indexed binning data may include a data entry for each of the primitives to be rendered. Each of the data entries may indicate the bins to which a bounding region that is associated with a respective one of the primitives to be rendered contributes pixel data. A bounding region may be associated with a respective one of the primitives to be rendered if the bounding region encompasses the primitive to be rendered and if the bounding region is used to generate binning data for rendering the primitive to be rendered.

In examples where a single bounding region is used for executing a draw call, the primitive-indexed binning data may include the same set of bins for each of the primitives to be rendered. In other words, because the same bounding region is used to generate the binning data for each of the primitives to be rendered, each of the primitives to be rendered will effectively inherit the same binning data from that bounding region.

In examples where multiple bounding regions are used for executing a draw call, the plurality of primitives to be rendered during the draw call may be subdivided into a plurality of groups of primitives where each group of primitives is associated a respective one of a plurality of bounding regions. In such examples, the primitive-indexed binning data may include the same set of bins for each of the groups of primitives to be rendered. That is, each of the primitives in a single group of primitives to be rendered will effectively inherit the same binning data from a single bounding region. A group of primitives to be rendered may include one or more primitives.

In additional examples, binning data 46 may be indexed by vertex, which may be referred to herein as vertex-indexed binning data. In such examples, the vertex-indexed binning data may include a data entry for each of the vertices to be rendered. Each of the data entries may indicate the bins to which a bounding region that is associated with a respective one of the vertices to be rendered contributes pixel data. A bounding region may be associated with a respective one of the vertices to be rendered if the bounding region encompasses the vertex to be rendered and if the bounding region is used to generate binning data for rendering the vertex to be rendered. A bounding region may be used to generate binning data for rendering the vertex to be rendered if the bounding region is used to generate binning data for rendering a primitive that includes the vertex to be rendered.

Similar to the primitive-indexed binning data, in examples where a single bounding region is used for executing a draw call, the vertex-indexed binning data may include the same set of bins for each of the vertices to be rendered. Likewise, in examples where multiple bounding regions are used for executing a draw call, the vertex-indexed binning data may include the same set of bins for each of the groups of primitives to be rendered.

Rasterized primitive data 48 may include data indicative of a rasterized version of the primitives to be rendered during the draw call. A rasterized version of a primitive may, in some examples, refer to a version of a geometrically-defined primitive that is sampled at regularly-spaced sampling locations or pixels. In some examples, the rasterized version of the primitives to be rendered may correspond to a composite of the rasterized versions of the individual primitives that make up the bounding region. A composite of the rasterized versions of individual primitives may refer to a single render target where rasterized versions of the individual primitives are merged together based on an ordering scheme and/or blending scheme.

In some cases, the rasterized version of the primitives may be stored as a plurality of pixels. Each of the pixels may be associated with one or more spatial locations of the render target, and may include one or more attributes indicative of the color of the respective pixel. In some cases, each of the pixels may further include one or more attributes indicative of the transparency of the pixel. In some examples, rasterized bounding region data 44 may store Red, Green, Blue, and Alpha (RGBA) attributes for each pixel where the "RGB" components correspond to color values and the "A" component corresponds to an alpha value.

The techniques described in this disclosure may be implemented in any of the components shown in FIG. 2 including, e.g., software application 24, graphics API 26, GPU driver 28, command engine 32 and processing units 34. For example, the binning pass pipeline and the rendering pass pipelines may be implemented by processing units 34. As another example, software application 24, GPU driver 28 and/or command engine 32 may configure each of processing units 34 to implement a respective one of the rendering pipelines. As a further example, software application 24, GPU driver 28 and/or processing units 34 may generate binning data based on a rasterized version of a bounding region. As another example, software application 24, GPU driver 28 and/or processing units 34 may generate modified primitive data to be used during each of the rendering passes based on the binning data.

By using one or more bounding regions to generate binning data for the primitives to be rendered, the number of vertices processed by processing units 34 of GPU 12 during the binning pass may, in some cases, be reduced relative to other tile-based rendering techniques that may generate the binning data based on rasterized versions of the actual primitives to be rendered. Reducing the number of vertices to be processed by processing units 34 may free up processing resources in GPU 12 for other tasks. In this manner, the performance of a tile-based rendering graphics processing system may be improved.

Figure 3:
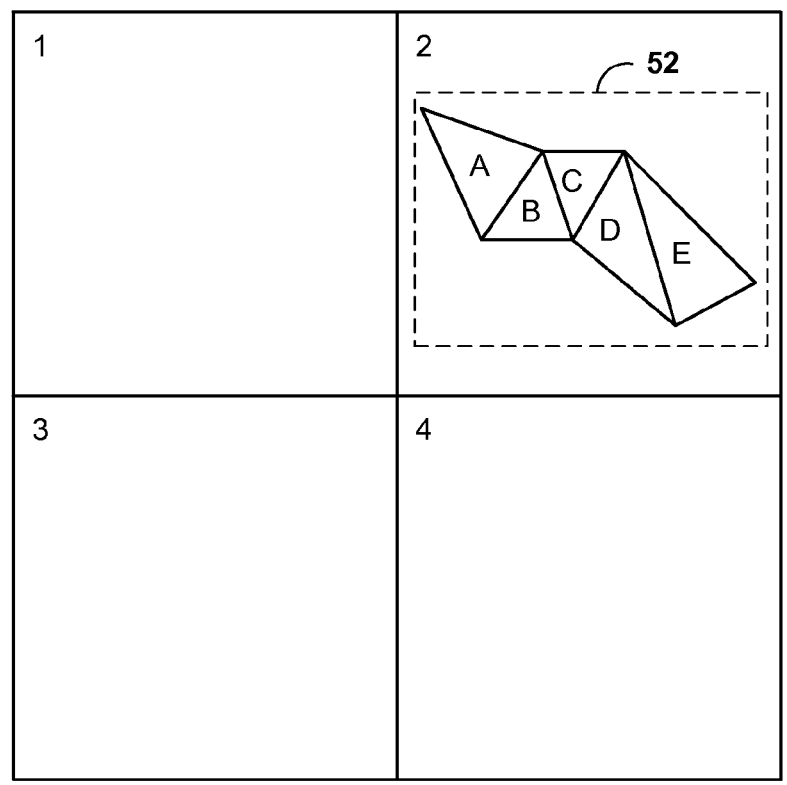
FIG. 3 is a conceptual diagram illustrating an example render target that is subdivided into sub-regions and a plurality of primitives displayed on the subdivided render target.

FIG. 3 is a conceptual diagram illustrating an example render target 50 that is subdivided into sub-regions and a plurality of primitives displayed on the subdivided render target. In some cases, render target 50 may correspond to a frame buffer. As shown in FIG. 3, render target 50 is divided into a plurality of non-overlapping sub-regions (alternatively referred to as bins or tiles), which are numbered 1-4. Each of the sub-regions may correspond to a subset of the pixels in render target 50 (e.g., a 16×16 tile of pixels, etc.).

FIG. 3 also illustrates rasterized versions of five different primitives, which are labeled A-E. Each of primitives A-E may correspond to a higher-order surface, which when rendered, may be tessellated into a plurality of low-order primitives to be rasterized. As shown in FIG. 3, each of the primitives contributes pixel data to bin 2 and none of the other bins. Also shown in FIG. 3 is a bounding region 52 that encompasses each of primitives A-E. Although bounding region 52 is conceptually depicted as a two-dimensional rectangle in FIG. 3, bounding region 52 may actually correspond to a three-dimensional shape or volume, such as, e.g., a rectangular prism, that encompasses primitives A-E in world space. Hence, bounding region 50 may alternatively be referred to as a bounding volume.

To generate binning data to be used for performing the rendering passes, a conventional tile-based rendering GPU may perform a binning pass for each of primitives A-E. This may include tessellating each of primitives A-E into a plurality of low-order primitives, processing each of these low-order primitives in the post-tessellation geometry pipeline, rasterizing each of the low-order primitives, and generating binning data based on the rasterized versions of the low-order primitives. However, the techniques of this disclosure may, in some examples, perform a single binning pass based on bounding region 52. This may reduce the number of instantiations of the geometry pipeline in GPU 12, which may in some cases, improve the performance of a tile-based rendering GPU.

In the specific example of FIG. 3, assuming that each of primitives A-E is tessellated into 16 different tessellated primitives, and assuming that the bounding region is a rectangular prism formed by 12 triangular primitives, the techniques of this disclosure may reduce the number of instantiations of the post-tessellation geometry pipeline from eighty instantiations (5 primitives×16 tessellated primitives=80 instantiations) to twelve instantiations (one instantiation for each of the triangular primitives). Moreover, in this example, the number of post-tessellation geometry pipeline instantiations during the rendering passes remains the same at 80. Therefore, the total number of geometry pipeline instantiations (i.e., binning pass instantiations+rendering pass instantiations) has been reduced by approximately 42% from 160 instantiations to 92 instantiations. The techniques of this disclosure may, in some examples, achieve this reduction in graphics pipeline passes without compromising the memory bandwidth efficiencies that occur when using tile-based rendering and without sacrificing the quality of the resulting image.

Although the sub-regions shown in FIG. 3 are substantially the same size and shape, in other examples, the sub-regions may have different sizes and/or different shapes. In addition, the size and shape of the sub-regions need not be substantially fixed at the time of manufacture or at the time of rendering, but in some examples, may be dynamically adjusted during operation of GPU 12.

Figure 4:
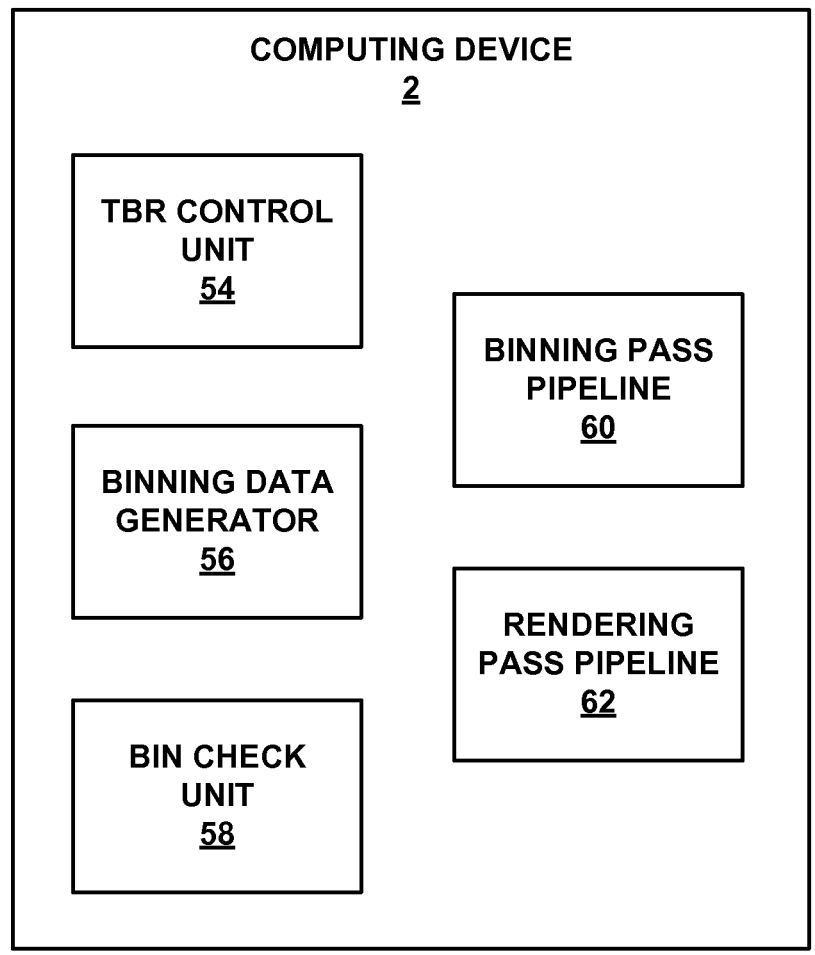
FIG. 4 is a block diagram illustrating example tile-based rendering components of the computing device shown in FIG. 1 that may be used to implement the tile-based rendering techniques of this disclosure.

FIG. 4 is a block diagram illustrating example tile-based rendering components of the computing device 2 shown in FIG. 1 that may be used to implement the tile-based rendering techniques of this disclosure. As shown in FIG. 4, computing device 2 includes a tile-based rendering (TBR) control unit 54, a binning data generator 56, a bin check unit 58, a binning pass pipeline 60, and a rendering pass pipeline 62. In general, the functionality attributed to TBR control unit 54, binning data generator 56, and bin check unit 58 may be implemented by any combination of CPU 6 and/or GPU 12 shown in FIGS. 1 and 2, and the functionality of binning pass pipeline 60 and rendering pass pipeline 62 may be implemented by GPU 12 shown in FIGS. 1 and 2.

TBR control unit 54 is configured to receive a draw call that instructs GPU 12 to render a plurality of primitives. In response to receiving the draw call, TBR control unit 54 is configured to cause GPU 12 to perform tile-based rendering based on the draw call, and based on a bounding region that encompasses the plurality of primitives to be rendered.

In order to cause GPU 12 to perform tile-based rendering, TBR control unit 54 may, in some examples, cause GPU 12 to perform a binning pass based on a bounding region to generate a rasterized version of the bounding region, cause binning data to be generated based on the rasterized version of the bounding region, and cause GPU 12 to perform a rendering pass for each of a plurality of bins (i.e., sub-regions of the render target). In order to cause GPU 12 to perform a binning pass based on a bounding region, TBR control unit 54 may configure processing units 34 of GPU 12 to implement binning pass pipeline 60, and cause binning pass pipeline 60 to generate a rasterized version of the bounding region.

In some examples, to configure processing units 34 to implement binning pass pipeline 60, TBR control unit 54 may also configure processing units 34 to execute one or more shader programs that process positional attributes of vertices without processing other attributes of the vertices. In some cases, the one or more shader programs may perform the same positional attribute processing algorithms as those which are performed during the rendering passes.

In additional examples, to configure processing units 34 to implement binning pass pipeline 60, TBR control unit 54 may also configure a rasterizer processing unit in processing units 34 to perform one or more of low-resolution rasterization, low-resolution z-buffering and/or back-face culling. Low-resolution rasterization may refer to rasterization that is performed at a resolution that is lower than the resolution at which rasterization is performed during the rendering passes. Low-resolution z-buffering may refer to z-buffering that is performed at a resolution that is lower than the resolution at which z-buffering is performed during the rendering passes. The resolution of rasterization may refer to the density of sampling locations and/or pixels that are used to rasterize the primitive or bounding region. Similarly, the resolution of z-buffering may refer to the density of sampling locations and/or pixels of a primitive that are used to perform z-buffering, and may correspond to the resolution of rasterization. Back-face culling may remove primitives that are not forward facing (i.e., not facing the camera) from the rasterized output.

In some examples, binning pass pipeline 60 may be a tessellation-enabled graphics rendering pipeline. In such examples, in order to cause GPU 12 to perform the binning pass, TBR control unit 54 may, in some examples, cause GPU 12 to process the bounding region using at least one tessellation processing stage of binning pass pipeline 60 in order to generate tessellation stage-processed bounding region data, and may cause GPU 12 to generate a rasterized version of the bounding region based on the tessellation stage-processed bounding region data.

In order to cause binning pass pipeline 60 to generate a rasterized version of the bounding region, TBR control unit 54 may, in some examples, configure the source data to be rendered by binning pass pipeline 60 to correspond to data indicative of the bounding region, and cause binning pass pipeline 60 to generate a rasterized version of the bounding region specified by the source data.

In some examples, TBR control unit 54 may receive the bounding region from an application executing on CPU 6 (e.g., software application 24, GPU driver 28, etc.). For example, the software application executing on CPU 6 may place data indicative of the bounding region to use when performing tile-based rendering into memory 10 prior to issuing a draw call. In some cases, the draw call may have a flag or parameter that indicates whether a bounding region is to be used for performing a binning pass. In response to receiving the draw call, TBR control unit 54 may selectively use a bounding region to perform tile-based rendering based on the flag or parameter. In some examples, the draw call instruction may specify the location where the bounding region to be used during the binning pass is stored in memory 10.

In examples where software application 24 (e.g., a graphics application) provides the bounding region to be used for performing the binning pass, software application 24 may, in some examples, provide a bounding region that is used by software application 24 for purposes other than exclusively for the purpose of tile-based rendering. For example, the bounding region provided by software application 24 may be a bounding region that is used by a graphics application for collision detection. As another example, the bounding region provided by software application 24 may be a bounding region that is used by a graphics application for clipping. By using a bounding region that is already in use by software application 24 for other purposes, the benefits of performing binning passes based on bounding regions may be achieved without requiring extra processing to be performed at render time to generate the bounding region at render time.

In additional examples, TBR control unit 54 may cause CPU 6 and/or GPU 12 to generate a bounding region in response to receiving a draw call. The bounding region may be generated based on data indicative of the primitives to be rendered during the draw call.

In examples where TBR control unit 54 is a part of CPU 6, TBR control unit 54 may cause binning pass pipeline 60 to generate a rasterized version of the bounding region by, for example, issuing a draw call to GPU 12 with the bounding region specified as the source data for the draw call. In examples where TBR control unit 54 is a part of GPU 12, TBR control unit 54 may cause binning pass pipeline 60 to generate a rasterized version of the bounding region by, for example, sending a control signal to binning pass pipeline 60 to initiate the performance of a binning pass based on the bounding region specified in the source data.

In order to cause binning data to be generated based on the rasterized version of the bounding region, TBR control unit 54 may, in some examples, cause binning data generator 56 to generate the binning data based on the rasterized version of the bounding region. Example techniques for generating binning data are described below with respect to binning data generator 56.

In some examples, binning data generator 56 may be a part of binning pass pipeline 60 and be invoked as part of the binning pass. In such examples, in order to cause binning data generator 56 to generate the binning data based on the rasterized version of the bounding region, TBR control unit 54 may cause binning pass pipeline 60 to perform a binning pass based on the bounding region. During the binning pass, binning pass pipeline 60 may rasterized the bounding region, and generate the binning data based on a rasterized version of the bounding region.

In further examples, binning data generator 56 may be a part of CPU 6. In such examples, in order to cause binning data generator 56 to generate the binning data based on the rasterized version of the bounding region, TBR control unit 54 may cause CPU 6 (e.g., GPU driver 28) to generate binning data in response to receiving data indicative of a rasterized version of a bounding region from GPU 12.

In order to cause GPU 12 to perform a rendering pass for each of the plurality of bins, TBR control unit 54 may configure processing units 34 of GPU 12 to implement rendering pass pipeline 62, cause modified primitive data to be generated for each of the rendering passes, and set up binning buffer 36 in GPU 12 for each of the rendering passes. In addition, for each of the rendering passes, TBR control unit 54 may cause GPU 12 to generate a composite, rasterized version of the primitives included in the modified primitive data that corresponds to the respective rendering pass, and cause binning buffer 36 to be resolved to the render target. The modified primitive data for a respective rendering pass may include primitives that contribute pixel data to a respective one of the bins of the render target, and may not include one or more primitives that do not contribute pixel data to the respective one of the bins of the render target. A composite, rasterized version of the primitives may be a version of the rasterized primitives where the primitives are merged and/or composited into a single rasterized image.

To configure processing units 34 to implement rendering pass pipeline 62, TBR control unit 54 may, in some examples, configure processing units 34 to execute one or more shader programs that process positional attributes of vertices and process other attributes of the vertices (e.g., color attributes, normal attributes, etc.) in addition to the positional attributes. In some cases, the one or more shader programs may perform the same positional attribute processing algorithms as those which are performed during the binning pass.

In additional examples, to configure processing units 34 to implement rendering pass pipeline 62, TBR control unit 54 may also configure a rasterizer processing unit in processing units 34 to perform one or more of high-resolution rasterization, high-resolution z-buffering and/or back-face culling. High-resolution rasterization may refer to rasterization that is performed at a resolution that is higher than the resolution at which rasterization is performed during the binning pass. High-resolution z-buffering may refer to z-buffering that is performed at a resolution that is higher than the resolution at which z-buffering is performed during the binning pass. The resolution of rasterization may refer to the density of sampling locations and/or pixels that are used to rasterize the primitive or bounding region. Similarly, the resolution of z-buffering may refer to the density of sampling locations and/or pixels of a primitive that are used to perform z-buffering, and may correspond to the resolution of rasterization. In some cases, the resolution of rasterization and z-buffering for the rendering passes may correspond to a display resolution (i.e., the resolution at which the image is displayed on a display). Back-face culling may remove primitives that are not forward facing (i.e., not facing the camera) from the rasterized output.

In some examples, rendering pass pipeline 62 may be a tessellation-enabled graphics pipeline. In such examples, in order to cause GPU 12 to perform a rendering pass for each of the plurality of bins, TBR control unit 54 may, in some examples, cause GPU 12 to process, for each of the rendering passes, the primitives included in the modified primitive data for the respective rendering pass using at least one tessellation stage of rendering pass pipeline 62 in order to generate tessellation stage-processed primitive data, and may cause GPU 12 to generate a rasterized version of the primitives included in the modified primitive data based on the tessellation stage-processed primitive data.

In order to cause modified primitive data to be generated for each of the rendering passes, TBR control unit 54 may, in some examples, cause bin check unit 58 to generate the modified primitive data based on the data indicative of the primitives to be rendered during the draw call, the binning data, and data indicative of the current bin to be rendered. In some examples, TBR control unit 54 may provide the data indicative of the current bin to be rendered to bin check unit 58. Example techniques for generating the binning data are described below with respect to bin check unit 58.

In some examples, bin check unit 58 may be a part of rendering pass pipeline 62 and be invoked as part of each of the rendering passes. In such examples, in order to cause rendering pass pipeline 62 to generate the modified primitive data for a particular rendering pass, TBR control unit 54 may cause rendering pass pipeline 62 to perform the particular rendering pass based on data indicative of the current bin to be rendered and the binning data. In such examples, TBR control unit 54 may specify data indicative of all of the primitives to be rendered during the draw call as the source data for each of the rendering passes. During each of the rendering passes, bin check unit 58 may generate the modified primitive data for the respective rendering pass, and rendering pass pipeline 62 may rasterize the primitives included in the modified primitive data to generate a composite, rasterized version of the primitives included in the modified primitive data with respect to a particular sub-region of a render target.

In further examples, bin check unit 58 may be a part of CPU 6. In such examples, in order to cause bin check unit 58 to generate the modified primitive data for a particular rendering pass, TBR control unit 54 may, for each of the rendering passes, cause CPU 6 (e.g., GPU driver 28) to generate the modified primitive data for the respective rendering pass based on the data indicative of the primitives to be rendered during the draw call, the binning data, and data indicative of the current bin to be rendered. In such examples, for each of the rendering passes, TBR control unit 54 may cause rendering pass pipeline 62 to perform the rendering pass with the modified primitive data for the respective rendering pass specified as the source data for the respective rendering pass.

In order set up binning buffer 36 for each of the rendering passes, TBR control unit 54 may cause binning buffer 36 of GPU 12 to be initialized. In some examples, initializing binning buffer 36 may correspond to setting the pixel values in binning buffer 36 to a default value, such as, e.g., a background color. In cases where TBR control unit 54 is a part of CPU 6, TBR control unit 54 may, in some examples, cause binning buffer 36 to be initialized by sending one or more binning buffer initialization commands to GPU 12, e.g., by placing one or more commands 38 into memory 10.

In some examples, in addition to setting up binning buffer 36 for each of the rendering passes, TBR control unit 54 may also set up the scissor rectangle for the rasterizer processing unit based on the sub-region of the render target that corresponds to the current rendering pass. The scissors rectangle may be used to limit the pixels produced by the rasterizer processing unit to those which are part of the sub-region of the render target to be rendered during a given rendering pass. The rasterizer processing unit may selectively discard pixels based on the scissors rectangle (e.g., discard pixels that are outside of the scissors rectangle).

In order to cause GPU 12 to generate a composite, rasterized version of the primitives included in modified primitive data that corresponds to the respective rendering pass, TBR control unit 54 may, in some examples, configure the source data to be rendered by rendering pass pipeline 62 to correspond to data indicative of some or all of the primitives to be rendered during the draw call, and cause rendering pass pipeline 62 to generate a composite, rasterized version of the primitives specified by the source data. It should be noted that the data indicative of the primitives to be rendered during the draw call may correspond to the actual primitives to be rendered and displayed in contrast to a bounding region that is not intended to be displayed.

In some examples, rendering pass pipeline 62 may generate the modified primitive data for each of the rendering passes. In such examples, TBR control unit 54 may configure the source data for the rendering passes to correspond to data indicative of all of the primitives to be rendered during the draw call, and rendering pass pipeline 62 may generate the modified primitive data for each rendering pass based on the data indicative of all of the primitives to be rendered during the draw call. In further examples, a bin check unit 58 that is separate from rendering pass pipeline 62 (e.g., a bin check unit 58 that is a part of CPU 6 or that is part another portion of GPU 12) may generate the modified primitive data for each of the rendering passes. In such examples, TBR control unit 54 may configure the source data for each of the rendering passes to correspond to the modified primitive data that is generated by bin check unit 58 for the respective rendering pass.

In examples where TBR control unit 54 is a part of CPU 6, TBR control unit 54 may cause rendering pass pipeline 62 to generate a composite, rasterized version of the primitives by, for example, issuing a draw call to GPU 12 with the primitives specified as the source data for the draw call. In examples where TBR control unit 54 is a part of GPU 12, TBR control unit 54 may cause rendering pass pipeline 62 to generate a composite, rasterized version of the primitives by, for example, sending a control signal to rendering pass pipeline 62 to initiate the performance of a rendering pass based on the primitives specified in the source data.

In examples where rendering pass pipeline 62 generates the modified primitive data for each of the rendering passes, TBR control unit 54 may cause rendering pass pipeline 62 to generate a composite, rasterized version of the primitives by, for example, configuring the source data to be rendered by rendering pass pipeline 62 to correspond to data indicative of all of the primitives to be rendered during the draw call, providing rendering pass pipeline 62 with data indicative of one of a plurality of sub-regions of a render target to be rendered (e.g., data indicative of the current bin to be rendered), and issuing a draw call to rendering pass pipeline 62 that causes rendering pass pipeline 62 to selectively render or not render primitives included in the source data based on the current bin (e.g., based on the data indicative of the one of the plurality of sub-regions of a render target to be rendered).

In order cause binning buffer 36 to be resolved to the render target, TBR control unit 54 may transfer the data that is stored in binning buffer 36 after the completion of a rendering pass to the render target (e.g., primitive data 40 in memory 10). In some cases, transferring the data stored in binning buffer 36 to a render target may involve overwriting a portion of the data stored in the render target with the data stored in binning buffer 36. In other cases, transferring the data stored in binning buffer 36 to the render target may involve compositing, combining and/or merging the data stored in the render target with the data stored in binning buffer 36.

In some examples, TBR control unit 54 may perform the rendering passes for a rendering target in a predetermined order (e.g., proceeding (in terms of bin location) from left-to-right and top-to-bottom, etc.). In additional examples, TBR control unit 54 may bypass rendering passes for sub-regions of the render target to which no primitive contributes primitive data. In further examples, TBR control unit 54 may dynamically generate a rendering pass order based on the binning data, the primitives to be rendered, and/or other criteria.

In examples where a single bounding region is used to generate the binning data for all of the primitives to be rendered as part of a single draw call, TBR control unit 54 may, in some examples, bypass rendering passes (i.e., cause the rendering passes to not be performed) for bins to which the bounding region does not contribute image data. In other words, in such examples, TBR control unit 54 may perform rendering passes only for bins to which the bounding region contributes pixel data. In addition, in such examples, TBR control unit 54 may not necessarily use a bin check unit 58 to discard primitives and generate modified primitive data because all of the primitives will be rendered during the rendering passes that are actually performed. For example, if a single bounding region that encompasses all of the primitives to be rendered as part of a draw call contributes pixel data to two different bins of a render target, then all of the primitives to be rendered as part of a draw call may be rendered during each of the rendering passes for the two bins. In such an example, TBR control unit 54 may not necessarily cause rendering passes to be performed for the remaining bins.

Binning data generator 56 is configured to generate binning data based on one or more bounding regions that encompass all or a subset of the primitives to be rendered. In some examples, a single bounding region may be used to generate the binning data for a single draw call. In such examples, binning data generator 56 may receive data indicative of a rasterized version of a bounding region, and generate binning data based on the data indicative of the rasterized version of the bounding region.

In some examples, the data indicative of the rasterized version of the bounding region may include data indicative of the rasterized versions of the individual primitives that form the bounding region. In further examples the data indicative of the rasterized version of the bounding region may include data indicative of a composite, rasterized version of the primitives that form the bounding region.

The binning data may include data indicating to which of a plurality of bins of a render target the bounding region contributes. The binning data may, in some examples, be any combination of bounding region-indexed binning data, primitive-indexed binning data, and vertex-indexed binning data.

In examples where a single bounding region is used to generate the binning data for a single draw call, in order to generate the binning data, binning data generator 56 may determine, based on a rasterized version of a bounding region, to which of a plurality of bins of a render target the bounding region contributes pixel data, and generate the binning data based on the determination. For bounding region-indexed binning data, binning data generator 56 may generate the binning data such that the binning data includes a single data entry indicating to which of the plurality of bins of a render target the bounding region contributes pixel data.

For primitive-indexed binning data, binning data generator 56 may generate the binning data such that the binning data includes a plurality of entries where each of the entries may correspond to a respective primitive and may indicate to which of the plurality of bins of a render target a bounding region that is associated with the respective primitive contributes pixel data. Because the bounding region associated with each of the primitives is the same in this example, binning data generator 56 may generate the binning data such that each of the entries includes the same set of bins (i.e., the set of bins to which the bounding region contributes pixel data).

For vertex-indexed binning data, binning data generator 56 may generate the binning data such that the binning data includes a plurality of entries where each of the entries may correspond to a respective vertex and may indicate to which of the plurality of bins of a render target a bounding region that is associated with the respective vertex contributes pixel data. Because the bounding region associated with each of the vertices is the same in this example, binning data generator 56 may generate the binning data such that each of the entries includes the same set of bins (i.e., the set of bins to which the bounding region contributes pixel data).

In further examples, multiple bounding regions may be used to generate the binning data for a single draw call. In such examples, binning data generator 56 may receive data indicative of rasterized versions of a plurality of bounding regions, and generate binning data based on such data. For example, binning data generator 56 may determine, for each of the bounding regions, to which of a plurality of bins of a render target each of the bounding regions contributes pixel data based on a rasterized version of the respective bounding region, and generate the binning data based on the determination.

For bounding region-indexed binning data, binning data generator 56 may generate the binning data such that the binning data includes a plurality of entries. Each of the entries may correspond to a respective bounding region and may indicate to which of the plurality of bins of a render target the respective bounding region contributes pixel data.

For primitive-indexed binning data, binning data generator 56 may generate the binning data such that the binning data includes a plurality of entries where each of the entries may correspond to a respective primitive and may indicate to which of the plurality of bins of a render target a bounding region that is associated with the respective primitive contributes pixel data. In some examples, binning data generator 56 may generate the primitive-indexed binning data based on the rasterized versions of the bounding regions and based on mapping data that indicates, for each of the primitives, which of the plurality of bounding regions is associated with the respective primitive. Binning data generator 56 may receive the mapping data from one or more of software application 24, GPU driver 28, and a bounding region generator.

For vertex-indexed binning data, binning data generator 56 may generate the binning data such that the binning data includes a plurality of entries where each of the entries may correspond to a respective vertex and may indicate to which of the plurality of bins of a render target a bounding region that is associated with the respective vertex contributes pixel data. In some examples, binning data generator 56 may generate the vertex-indexed binning data based on the rasterized versions of the bounding regions and based on mapping data that indicates, for each of the vertices, which of the plurality of bounding regions is associated with the respective vertex. Binning data generator 56 may receive the mapping data from one or more of software application 24, GPU driver 28, and a bounding region generator.

Bin check unit 58 may be configured to generate modified primitive data that is specific to a particular rendering pass. For example, bin check unit 58 may receive data indicative of a bin to be rendered during a rendering pass, data indicative of a plurality of primitives to be rendered during a draw call (i.e., primitive data), and binning data for the plurality of primitives to be rendered. Bin check unit 58 may selectively discard one or more portions of the data indicative of the plurality of primitives to be rendered based on the binning data and the data indicative of the bin to be rendered in order to generate modified primitive data. In some examples, the one or more portions of the data indicative of the plurality of primitives to be rendered may correspond to one or more vertices.

For example, for each of the primitives to be rendered, if the binning data indicates that the respective primitive does not contribute pixel data to the bin to be rendered, then bin check unit 58 may discard data indicative of the respective primitive such that the data is not included in the modified primitive data. Similarly, for each of the primitives to be rendered, if the binning data indicates that the respective primitive does contribute pixel data to the bin to be rendered, then bin check unit 58 may not discard the data indicative of the respective primitive such that the data is included in the modified primitive data.

In some examples, bin check unit 58 may be included as a processing stage in rendering pass pipeline 62. In such examples, discarding portions of the data may include not passing the data on to one or more subsequent processing stages in rendering pass pipeline 62, and not discarding portions of the data may include passing the data on to one or more subsequent processing stages in rendering pass pipeline 62. In some cases, the data may be one or more vertices that correspond to a primitive to be rendered.

In further examples, bin check unit 58 may be included in CPU 6. In such examples, discarding portions of the data may include not placing such data in a bin-specific vertex list for a particular bin (e.g., the modified primitive data for the particular bin), and not discarding portions of the data may include placing such data in the bin-specific vertex list for the particular bin. In such examples, TBR control unit 54 may, for each of the rendering passes, provide to rendering pass pipeline 62 a bin-specific vertex list that corresponds to the respective rendering pass.

For cases in which bin check unit 58 receives vertex-indexed binning data, bin check unit 58 may selectively discard each of one or more portions of the primitive data (i.e., data indicative of the plurality of primitives to be rendered) based on the data indicative of the bin to be rendered, and the binning data to generate modified data that is indicative of the plurality of primitives to be rendered during a particular rendering pass. In some examples, each of the portions of primitive data that is selectively discarded may be indicative of a respective one of the primitives to be rendered. In further examples, each of the portions of the primitive data that is selectively discarded may be indicative of a respective one of a plurality of vertices, and the plurality of vertices may be indicative of the primitives to be rendered.

In order to selectively discard the primitive data in examples where bin check unit 58 receives vertex-indexed binning data, bin check unit 58 may, in some examples, for each of the vertices to be rendered, determine whether the bins to be rendered for the respective vertex include the bin to be rendered for the current rendering pass based on the binning data. In such examples, bin check unit 58 may discard the respective vertex if the bins to be rendered for the respective vertex do not include the bin to be rendered for the current rendering pass, and not discard the respective vertex if the bins to be rendered for the respective vertex include the bin to be rendered for the current rendering pass. The bins to be rendered for the respective vertex may correspond to the bins to which a bounding region that was used to generate binning data for the respective vertex contributes pixel data. These bins may be identified in the entry of the vertex-indexed binning data that corresponds to the respective vertex that is being processed.

For cases in which bin check unit 58 receives primitive-indexed binning data, bin check unit 58 may receive mapping data indicative of which of a plurality of primitives is associated with each of one or more portions of the primitive data (i.e., the data indicative of the plurality of primitives to be rendered), and selectively discard each of the portions of the primitive data based on the data indicative of the bin to be rendered, the mapping data, and the binning data in order to generate modified data indicative of the plurality of primitives to be rendered. In some examples, each of the portions of the primitive data may be indicative of a respective one of the primitives to be rendered. In further examples, each of the portions of the primitive data may be indicative of a respective one of a plurality of vertices, and the plurality of vertices may be indicative of the primitives to be rendered.

The mapping data may indicate, for each of the portions of primitive data, which of the plurality of primitives is associated with the respective portion. For example, if each of the portions of primitive data corresponds to a vertex, then the mapping data may indicate, for each of the vertices, which of the plurality of primitives is associated with the respective vertex. Bin check unit 58 may receive the mapping data from one or more of software application 24, GPU driver 28, and a bounding region generator.

In order to selectively discard the primitive data in examples where bin check unit 58 receives primitive-indexed binning data, bin check unit 58 may, in some examples, for each of the vertices to be rendered, determine a respective one of the primitives that is associated with the respective vertex based on the mapping data. Bin check unit 58 may selectively discard the respective vertex based on the determined primitive that is associated with respective vertex.

In order to selectively discard the respective vertex based on the determined primitive, bin check unit 58 may, in some examples, for each of the vertices to be rendered, determine whether the bins to be rendered for the determined primitive that is associated with respective vertex include the bin to be rendered for the current rendering pass based on the binning data. In such examples, bin check unit 58 may discard the respective vertex if the bins to be rendered for the determined primitive do not include the bin to be rendered for the current rendering pass, and not discard the respective vertex if the bins to be rendered for the determined primitive include the bin to be rendered for the current rendering pass. The bins to be rendered for the determined primitive may correspond to the bins to which a bounding region that was used to generate binning data for the determined primitive contributes pixel data. These bins may be identified in the entry of the primitive-indexed binning data that corresponds to the determined primitive that is associated with the vertex that is being processed.

For cases in which bin check unit 58 receives bounding region-indexed binning data, bin check unit 58 may receive mapping data indicative of which of a plurality of bounding regions is associated with each of one or more portions of the primitive data (i.e., the data indicative of the plurality of primitives to be rendered), and selectively discard each of the portions of the primitive data based on the data indicative of the bin to be rendered, the mapping data, and the binning data in order to generate modified data indicative of the plurality of primitives to be rendered. In some examples, each of the portions of the primitive data may be indicative of a respective one of the primitives to be rendered. In further examples, each of the portions of the primitive data may be indicative of a respective one of a plurality of vertices, and the plurality of vertices may be indicative of the primitives to be rendered.

The mapping data may indicate, for each of the portions of primitive data, which of the plurality of bounding regions is associated with the respective portion. For example, if each of the portions of primitive data corresponds to a vertex, then the mapping data may indicate, for each of the vertices, which of the plurality of bounding regions is associated with the respective vertex. Bin check unit 58 may receive the mapping data from one or more of software application 24, GPU driver 28, and a bounding region generator.

In order to selectively discard the primitive data in examples where bin check unit 58 receives bounding region-indexed binning data, bin check unit 58 may, in some examples, for each of the vertices to be rendered, determine a respective one of the bounding regions that is associated with the respective vertex based on the mapping data. Bin check unit 58 may selectively discard the respective vertex based on the determined bounding region that is associated with respective vertex.

In order to selectively discard the respective vertex based on the determined bounding region, bin check unit 58 may, in some examples, for each of the vertices to be rendered, determine whether the bins to be rendered for the determined bounding region that is associated with respective vertex include the bin to be rendered for the current rendering pass based on the binning data. In such examples, bin check unit 58 may discard the respective vertex if the bins to be rendered for the determined bounding region do not include the bin to be rendered for the current rendering pass, and not discard the respective vertex if the bins to be rendered for the determined bounding region include the bin to be rendered for the current rendering pass. The bins to be rendered for the determined bounding region may correspond to the bins to which the determined bounding region contributes pixel data. These bins may be identified in the entry of the bounding region-indexed binning data that corresponds to the determined bounding region that is associated with the vertex that is being processed.

In examples where a single bounding region is used to generate the binning data for all of the primitives to be rendered as part of a single draw call, bin check unit 58 may, in some examples, receive binning data that is not indexed, but is merely indicative of the bins to be rendered for the draw call. In such examples, bin check unit 58 may selectively discard each of one or more portions of the primitive data based on data indicative of the bin to be rendered for the draw call and the binning data in order to generate modified data indicative of the plurality of primitives to be rendered.

In order to selectively discard the primitive data, bin check unit 58 may, in some examples, determine whether the bins to be rendered for the draw call include the bin to be rendered for the current rendering pass based on the binning data. Bin check unit 58 may discard all or part of the primitive data if the bins to be rendered for the determined rendering pass do not include the bin to be rendered for the current rendering pass, and not discard all or part of the primitive if the bins to be rendered for the determined rendering pass includes the bin to be rendered for the current rendering pass. In some examples, bin check unit 58 may not be used at all if a single bounding region is used to generate the binning data for all of the primitives to be rendered as part of a single draw call as discussed above with respect to TBR control unit 54.

Binning pass pipeline 60 may receive data indicative of a geometric definition of a bounding region, process the geometric definition of the bounding region using at least one tessellation processing stage of binning pass pipeline 60 in order to generate tessellation stage-processed bounding region data, and rasterize the tessellation stage-processed bounding region data to generate a rasterized version of the bounding region. In some examples, binning pass pipeline 60 may include binning data generator 56. In such examples, binning pass pipeline 60 may be further configured to generate binning data based on the rasterized version of the bounding region.

The geometric definition of the bounding region (i.e., a geometrically-defined bounding region) may correspond to bounding region data 42 shown in FIG. 2. The rasterized version of the bounding region may correspond to rasterized bounding region data 44 shown in FIG. 2. The binning data may correspond to binning data 46 shown in FIG. 2.

Rendering pass pipeline 62 may receive data indicative of a geometric definition of a plurality of primitives to be rendered, process the geometric definition of the primitives using at least one tessellation processing stage of binning pass pipeline 60 in order to generate tessellation stage-processed primitive data, rasterize the tessellation stage-processed primitive data for each of the primitives, and composite the primitives to generate a composite, rasterized version of the primitives. The geometric definition of the primitives to be rendered may correspond to primitive data 40 shown in FIG. 2. The rasterized version of the primitives may correspond to rasterized primitive data 48 shown in FIG. 2.

In some examples, rendering pass pipeline 62 may include bin check unit 58. In such examples, rendering pass pipeline 62 may be further configured to generate modified primitive data based on the input primitive data and binning data using the techniques described above with respect to bin check unit 58. The binning data may correspond to binning data 46 shown in FIG. 2.

In examples where rendering pass pipeline 62 includes bin check unit 58, rendering pass pipeline 62 may receive a plurality of primitives to be rendered, and selectively render or not render each of the plurality of primitives based on data indicative of the bin to be rendered and based on binning data that has been generated for the plurality of primitives to be rendered. In some examples, bin check unit 58 may be a processing stage within a plurality of processing stages that form rendering pass pipeline 62. In such examples, selectively rendering or not rendering each of the plurality of primitives may include selectively discarding or not discarding each of the plurality of primitives (and/or vertices corresponding to the primitives) based on the data indicative of the bin to be rendered and based on binning data that has been generated for the plurality of primitives to be rendered as discussed above with respect to bin check unit 58.

In some examples, some or all of binning pass pipeline 60 and/or rendering pass pipeline 62 may conform to an on-chip tessellation-enabled graphics pipeline defined by an on-chip, tessellation-enabled graphics API. For example, some or all of binning pass pipeline 60 and/or rendering pass pipeline 62 may conform to the Microsoft® DirectX (DX) 11 graphics pipeline defined by the Microsoft® DirectX (DX) 11 API, or to a later DirectX graphics pipeline defined by a later DirectX API. Further information regarding the general operation of the DirectX 11 graphics pipeline may be found in Zink et al., "Practical Rendering & Computation with Direct3D 11," CRC Press (2011), the entire content of which is incorporated herein by reference.

As another example, some or all of binning pass pipeline 60 and/or rendering pass pipeline 62 may conform to the OpenGL® 4.3 graphics pipeline defined according to the OpenGL® 4.3 graphics API, or to a version 4.0 or later OpenGL graphics pipeline defined by a version 4.0 or later OpenGL API. Further information regarding the general operation of the OpenGL graphics pipeline may be found in "The OpenGL® Graphics System: A Specification (Version 4.3 (Core Profile)—Aug. 6, 2012)," Aug. 6, 2012, The Khronos Group, Inc. available at http://www.opengl.org/registry/doc/glspec43. core.20120806pdf, the entire content of which is incorporated herein by reference.

Figure 5:
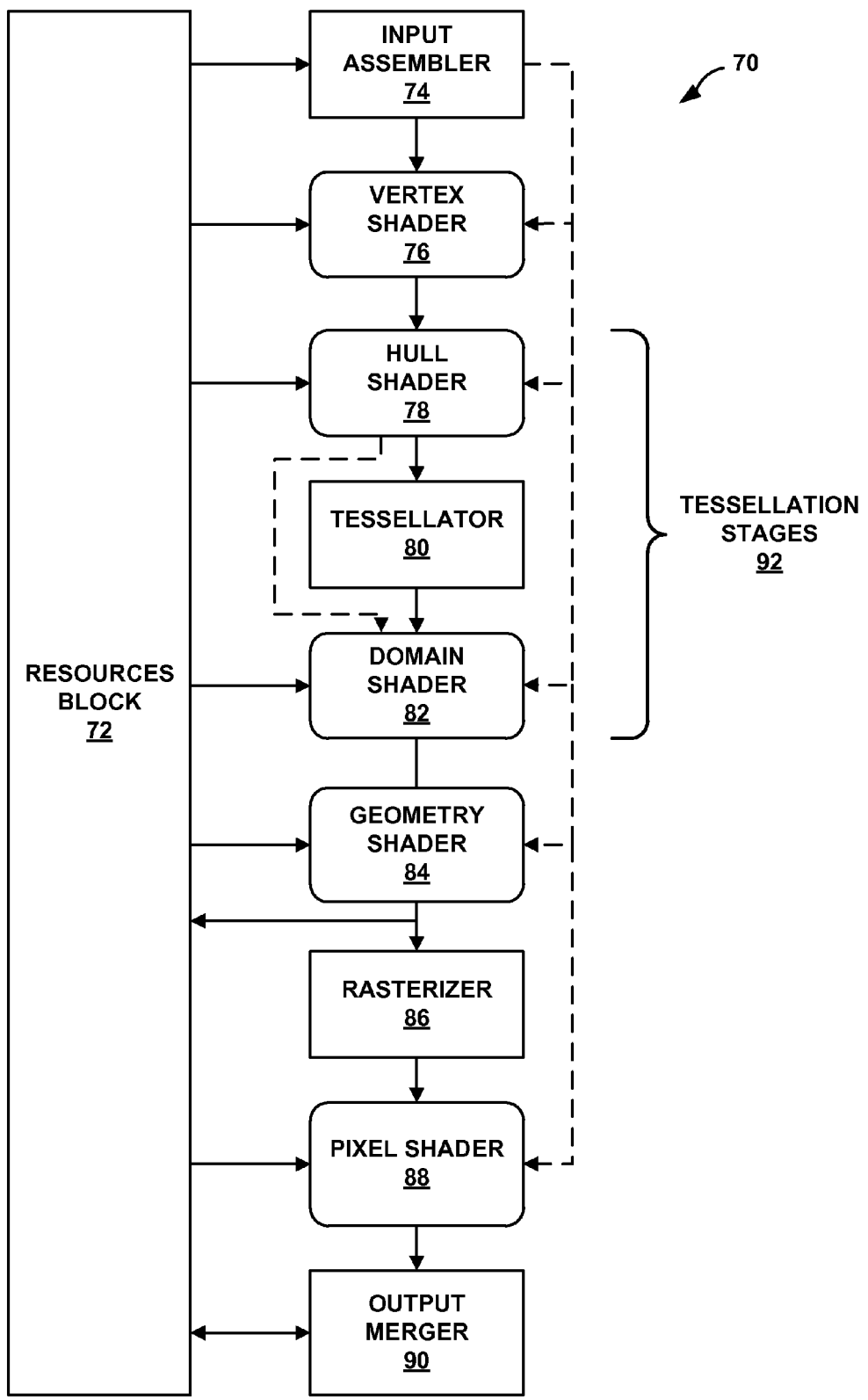
FIG. 5 is a block diagram illustrating an example graphics rendering pipeline according to this disclosure.

FIG. 5 is a block diagram illustrating an example graphics pipeline 70 according to this disclosure. In some examples, graphics pipeline 70 may implement all or a part of binning pass pipeline 60 and/or rendering pass pipeline 62 shown in computing device 2 of FIG. 4.

As shown in FIG. 5, graphics pipeline 70 includes a resources block 72 and a plurality of processing stages. The plurality of processing stages include an input assembler (IA) 74, a vertex shader (VS) 76, a hull shader (HS) 78, a tessellator 80, a domain shader (DS) 82, a geometry shader (GS) 84, a rasterizer 86, a pixel shader (PS) 88, and an output merger 90. Hull shader 78, tessellator 80, and domain shader 82 may form the tessellation stages 92 of graphics pipeline 70.

Resources block 72 may correspond to one or more memory resources used by graphics pipeline 70, such as, e.g., one or more textures and/or one or more buffers. Resources block 72 may store input data to be processed by one or more of the processing stages in graphics pipeline 70 and/or output data from one or more of the processing stages in graphics pipeline 70. As one example, resources block 72 may store one or more vertex buffers. The one or more vertex buffers may store a plurality of vertices and/or a plurality of control points. As another example, resources block 72 may store a frame buffer that holds a rasterized version of the primitives that are rendered according to the techniques of this disclosure. As a further example, resources block 72 may store binning buffer 36 shown in FIG. 2. In some examples, the memory resources that form resources block 72 may reside in memory 10 or a cache of GPU 12 in computing device 2. In some cases, the data stored in resources block 72 may conceptually correspond to one or more of primitive data 40, bounding region data 42, rasterized bounding region data 44, binning data 46, and rasterized primitive data 48 shown in FIG. 2.

The processing stages depicted in FIG. 5 with straight corners represent fixed-function processing stages, and the processing stages depicted in FIG. 5 with rounded corners represent programmable processing stages. For example, as shown in FIG. 5, input assembler 74, tessellator 80, rasterizer 86 and output merger 90 are fixed-function processing stages, and vertex shader 76, hull shader 78, domain shader 82, geometry shader 84 and pixel shader 88 are programmable processing stages. Each of the programmable stages may be configured to execute a shader program of a particular type. For example, vertex shader 76 may be configured to execute a vertex shader program, hull shader 88 may be configured to execute a hull shader program, etc. Each of the different types of shader programs may execute on a common shader unit of the GPU and/or on one or more dedicated shader units that are dedicated to executing shader programs of one or more particular types.

As shown in FIG. 3, input assembler 74, vertex shader 76, hull shader 78, domain shader 82, geometry shader 84, pixel shader 88 and output merger 90 are communicatively coupled to resources block 72. Input assembler 74, vertex shader 76, hull shader 78, domain shader 82, geometry shader 84, pixel shader 88 and output merger 90 are configured to retrieve and/or to receive input data from resources block 72. Geometry shader 84 and output merger 90 are configured to write output data to resources block 72. The above-described configuration of communication between the processing stages in graphics pipeline 70 and resources block 72 is merely one example of how the communication may be configured between the processing stages of graphics pipeline 70 and resources block 72. In other examples, more or less unidirectional and/or bi-directional communication channels may be provided between the processing stages of graphics pipeline 70 and resources block 72.

In some examples, the functionality of the different components and processing stages in graphics pipeline 70 may include some or all of the functionality described for similarly named components and processing stages in the Microsoft® DirectX (DX) 11 graphics pipeline. In addition to incorporating some or all of the functionality of the similarly named components and processing stages of the DX 11 pipeline in such examples, one or more of the components and processing stages in graphics pipeline 70 may also be configured to perform all or part of the tile-based rendering techniques of this disclosure.

When graphics pipeline 70 serves as a binning pass pipeline 60, in response to receiving a draw call or otherwise being invoked to perform a binning pass, input assembler 74 may receive bounding region data 42. For example, input assembler 74 may retrieve one or more vertices (or control points) from resources block 72 that are indicative of a bounding region that encompasses a plurality of primitives to be rendered, and pass the vertices on to vertex shader 76 for further processing.

Vertex shader 76 may generate vertex shader-processed vertices based on the input vertices received from input assembler 74. In some examples, vertex shader 76 may perform per-vertex processing on the input vertices received from input assembler 74 to generate output vertices. The output vertices may have modified attributes that result from the vertex processing, e.g., modified positional attributes. For example, vertex shader 76 may perform one or more transformations (e.g., a world transformation, a view transformation, a projection transformation, or any combination thereof) on the positional attributes of the input vertices to generate one or more transformed positional attributes for the output vertices. In further examples, vertex shader 76 may be a "pass-through" vertex shader 76 that passes the input vertices directly to the output without performing any substantive processing on the vertices. Vertex shader 76 may pass the output vertices on to hull shader 78 of tessellation stages 92 for further processing.

The input vertices received by vertex shader 76 and the output vertices generated by vertex shader 76 may be alternatively referred to as input control points and output control points, respectively. The output vertices generated by vertex shader 76 may be collectively indicative of the bounding region. For example, the output vertices may be collectively indicative of a vertex shader-processed version of the bounding region.

In some examples, the vertex processing performed by vertex shader 76 during the binning pass for the positional attributes of the vertices may be the same as the vertex processing performed by vertex shader 76 during the rendering pass for the positional attributes of the vertices. However, vertex processing for attributes other than the positional attributes may be omitted, in some examples, during the binning pass.

Tessellation stages 92 may generate a tessellation stage-processed version of each of the plurality of primitives that define the bounding region to be rasterized based on a vertex shader stage-processed version of the respective primitive that defines the bounding region. For example, tessellation stages 92 may receive and process vertices indicative of a vertex shader-processed version of the bounding region, and generate vertices indicative of a tessellation stage-processed version of the bounding region. Tessellation stages 92 may pass the vertices indicative of a tessellation stage-processed version of the bounding region on to geometry shader 84 for further processing.

In some examples, tessellation stages 92 may perform per-primitive processing. For example, if the bounding region is defined by a plurality of primitives, tessellation stages 92 may receive data indicative of a respective one of the plurality of primitives that defines the bounding region, and generate data indicative of a tessellation stage-processed version of the respective one of the plurality of primitives. In some examples, hull shader 78 may be invoked once per primitive (or patch), and domain shader 82 may be invoked once for each vertex in the primitive (or patch).

In some examples, the vertex processing performed by hull shader 78 and/or domain shader 82 during the binning pass for the positional attributes of the vertices may be the same as the vertex processing performed by hull shader 78 and/or domain shader 82 during the rendering pass for the positional attributes of the vertices. However, vertex processing for attributes other than the positional attributes may be omitted, in some examples, during the binning pass.

Hull shader 78 may generate a hull shader stage-processed version of each of the plurality of primitives that define the bounding region to be rasterized based on a vertex shader stage-processed version of the respective primitive that defines the bounding region. For example, hull shader 78 may receive vertices that are indicative of a vertex shader stage-processed version of one of the primitives that define the bounding region, may perform per-primitive processing on the vertices received from vertex shader 76 to generate output vertices, and may pass the output vertices on to domain shader 82 for further processing. In some examples, hull shader 78 may perform one or more transformations on the positional attributes of the input vertices to generate one or more transformed positional attributes for the output vertices. In further examples, hull shader 78 may be a "pass-through" hull shader 78 that passes the input vertices directly to the output without performing any substantive processing on the vertices.

In some examples, hull shader 78 may configure the tessellation factors for tessellator 80 such that no tessellation is performed during the binning pass. In further examples, hull shader 78 may configure the tessellation factors for tessellator 80 such that the same number of tessellation coordinates are produced by tessellator 80 as the number of vertices that are included in the input primitive received by hull shader 78 and/or tessellation stages 92. For example, hull shader 78 may configure the tessellation factors for tessellator 80 to cause three coordinates to be produced by tesselltator 80 if the primitive is a triangle.

Tessellator 80 may generate one or more coordinates for use by domain shader 82 based on a tessellation domain and one or more tessellation factors received by tessellator 80. In some examples, tessellator 80 may be configured to output a coordinate for each of the vertices that is included in the input primitive received by hull shader 78 and/or tessellation stages 92. The tessellation factors may specify a degree of tessellation that tessellator 80 is to apply to a particular tessellation domain (e.g., how finely the domain should be subdivided and/or the number of smaller objects into which the domain should be subdivided).

A tessellation domain may refer to an object that is used by tessellator 80 to generate a plurality of coordinates for use by domain shader 82. Conceptually, the tessellation domain may correspond to an object that is subdivided by tessellator 80 into a plurality of smaller objects. The positional coordinates of the vertices of the smaller objects are then sent to domain shader 82 for further processing. In some examples, the tessellation domain type may be selected from a set of tessellation domain types that include a quadrilateral tessellation domain type (i.e., a "quad"), a triangle tessellation domain type (i.e., a "tri"), and a line tessellation domain type (i.e., an "isoline"). The smaller objects into which the domain is subdivided, in some examples, may correspond to triangles, line segments, or points.

Domain shader 82 may generate a domain shader stage-processed version of each of the plurality of primitives that define the bounding region to be rasterized based on a hull shader stage-processed version of the respective primitive and one or more coordinates produced by tessellator 80. For example, domain shader 82 may receive coordinates generated by tessellator 80 and vertices from hull shader 78 that are indicative of a hull shader stage-processed version of one of the primitives that define the bounding region, and generate output vertices that correspond to a tessellation stage-processed version of the primitive. For example, for each coordinate received by tessellator 80, domain shader 82 may generate an output vertex that corresponds to one of the vertices received from hull shader 78. The tessellation stage-processed version of the primitive may be a version of the primitive received by tessellation stages 92.

If geometry shader 84 is enabled for graphics pipeline 70, then the output vertices generated by domain shader 82 may be passed on to geometry shader 84 for further processing. If geometry shader 84 is not enabled for graphics pipeline 70, then the output vertices generated by domain shader 82 may be passed on to rasterizer 86 for further processing.

Geometry shader 84 may generate a geometry shader stage-processed version of each of the plurality of primitives that define the bounding region to be rasterized based on a tessellation stage-processed version of the respective primitive. For example, geometry shader 84 may receive vertices indicative of a tessellation stage-processed version of a respective one of a plurality of primitives that define a bounding region, and generate output vertices that are indicative of a geometry shader stage-processed version of the respective one of a plurality of primitives. In some examples, geometry shader 84 may perform per-primitive processing on the input vertices received from domain shader 82 to generate the output vertices. The output vertices may have modified attributes that result from the per-primitive processing, e.g., modified positional attributes. In further examples, geometry shader 84 may be a "pass-through" geometry shader 84 that passes the input vertices directly to the output without performing any substantive processing on the vertices. Geometry shader 84 may pass the output vertices on to rasterizer 86 for further processing.

Rasterizer 86 may generate a rasterized version of each of the plurality of primitives that define the bounding region to be rasterized based on at least one of a tessellation stage-processed version of the respective primitive and a geometry shader stage-processed version of the respective primitive. For example, rasterizer 86 may convert a vertex representation of the respective primitive (e.g., a geometric representation of the primitive to be rasterized) into a pixel representation of the primitive (e.g., a rasterized version). Converting the vertex representation of the primitive into a pixel representation of the primitive may involve sampling the primitive at a plurality of pixel locations.

For example, for a triangle primitive, rasterizer 86 may receive three vertices that correspond to a triangle primitive, and convert the three vertices into a plurality of pixels that correspond to the screen pixel locations that are covered by the triangle primitive. Screen pixel locations that are covered by the triangle primitive may include screen pixel locations that correspond to the vertices of the triangle, the edges of the triangle, and the interior of the triangle.

In some examples, rasterizer 86 may perform low-resolution rasterization of an input primitive to generate a low-resolution rasterized version of the input primitive. In further examples, rasterizer 86 may perform back-face culling of the input primitive, low-resolution rasterization of the input primitive, and low-resolution z-buffering to generate a back-face culled, low resolution, z-buffered rasterized version of the input primitive.

Pixel shader 88 may generate a pixel shader-processed version of a primitive that defines a bounding region based on the rasterized version of the primitive received from rasterizer 86. For example, pixel shader 88 may receive one of a plurality of pixels from rasterizer 86 that defines a rasterized version of a primitive, and generate an output pixel based on the pixel. In some examples, pixel shader 88 may perform per-pixel processing on the pixels to generate the output pixels. In further examples, pixel shader 88 may be a "pass-through" pixel shader 88 that generates output pixels without performing any substantive processing on the pixels. Pixel shader 88 passes the output pixels on to output merger 90 for further processing.

Output merger 90 may place pixel data received from pixel shader 88 into a render target (e.g., a frame buffer or a binning buffer). In some examples, output merger 90 may merge the pixel data received from pixel shader 88 with the pixel data already stored in a render target based on a raster operation. For example, output merger 90 may merge the pixel data of a currently processed primitive of the bounding region with pixel data for previously processed primitives of the bounding region to generate a composite, rasterized version of the primitives that define the bounding region (i.e., a rasterized version of the bounding region).

Although not shown in FIG. 5, in cases where graphics pipeline 70 is a binning pass pipeline, graphics pipeline 70 may further include, in some examples, a binning data generator 56. In such examples, binning data generator 56 may generate binning data 46 based on the composite, rasterized version of the primitives that define the bounding region.

When graphics pipeline 70 serves as a rendering pass pipeline 62, in response to receiving a draw call or otherwise being invoked to perform a rendering pass, input assembler 74 may receive modified primitive data that is indicative of a plurality of primitives to be rendered during the current rendering pass. For example, input assembler 74 may retrieve one or more vertices (or control points) from resources block 72 that are indicative of the plurality of primitives to be rendered.

In general, the components included in graphics pipeline 70 may operate during a rendering pass in a similar fashion to that which is described in the binning pass above except that the rendering pass is performed with respect to primitive data 40 instead of bounding region data 42, shader processing stages may perform processing on attributes other than just positional attributes, and tessellation stages 92 may tessellate an input primitive into a plurality of tessellated primitives.

During the rendering pass, vertex shader 76 may generate vertex shader-processed vertices based on input vertices received from input assembler 74. The per-vertex processing performed by vertex shader 76 during the rendering passes may be similar to the per-vertex processing performed by vertex shader 76 for the binning pass except that, in examples where the binning pass merely processes positional attributes, the rendering passes may process attributes other than positional attributes in addition to processing the positional attributes. The output vertices of vertex shader 76 may be collectively indicative of a vertex shader-processed version of a primitive to be rendered.

Tessellation stages 92 may generate a plurality of tessellated primitives that collectively represent an input primitive. In cases where the input primitive is a higher-order surface (e.g., a patch, a Bézier surfaces, a subdivision surfaces, etc.), tessellation stages 92 may tessellate the higher-order surface into a plurality of lower-order primitives (e.g., points, lines, triangles). In some examples, the higher-order surfaces may be curved surfaces, and the lower-order primitives may have non-curved surfaces and non-curved edges. Each higher order surface may be defined based on one or more control points in a control point patch list and one or both of a hull shader program and a domain shader program that are used to tessellate the surface. The plurality of lower-order primitives generated for each tessellated higher-order surface may approximate the curvature of the higher-order surface. The plurality of primitives generated by tessellation stages 92 may correspond to a tessellation stage-processed version of the input primitive.

In general, hull shader 78 may pass the control points received from vertex shader 76 to domain shader 82 for further processing, and provide configuration data to tessellator 80. Tessellator 80 may determine values at which one or more parametric equations that represent a particular type of higher-order surface should be evaluated. Domain shader 82 may evaluate the parametric equations at the values determined by tessellator 80, and output a vertex for each evaluation. The vertices that are output by domain shader 82 may be grouped together to define a plurality of low-order primitives that approximate the curvature of the higher-order surface.

In some examples, the vertex and/or control point processing performed by hull shader 78 and/or domain shader 82 during the rendering passes for the positional attributes of the vertices and/or control points may be the same as the vertex processing performed by hull shader 78 and/or domain shader 82 during the binning pass for the positional attributes of the vertices. However, in examples where the binning pass merely processes positional attributes, the rendering passes may process attributes other than positional attributes in addition to processing the positional attributes.

Hull shader 78 may generate a hull shader stage-processed version of each of the plurality of primitives to be rendered based on a vertex shader stage-processed version of the respective primitive. In some examples, hull shader 78 may configure the tessellation factors for tessellator 80 such that each of the primitives is tessellated into a plurality of primitives that represent the input primitive. Tessellator 80 may generate one or more coordinates for use by domain shader 82 based on a tessellation domain and one or more tessellation factors received by tessellator 80.

Domain shader 82 may generate a domain shader stage-processed version of each of the plurality of primitives to be rendered based on a hull shader stage-processed version of the respective primitive and one or more coordinates produced by tessellator 80. For example, domain shader 82 may receive coordinates generated by tessellator 80 and control points from hull shader 78 that are indicative of a hull shader stage-processed version of one of the primitives to be rendered, and generate output vertices that correspond to a tessellation stage-processed version of the primitive. For example, for each coordinate received by tessellator 80, domain shader 82 may generate an output vertex that corresponds to one of the vertices of a tessellated primitive.

If geometry shader 84 is enabled for graphics pipeline 70, then the output vertices generated by domain shader 82 may be passed on to geometry shader 84 for further processing. If geometry shader 84 is not enabled for graphics pipeline 70, then the output vertices generated by domain shader 82 may be passed on to rasterizer 86 for further processing.

Geometry shader 84 may generate a geometry shader stage-processed version of each of the plurality of tessellated primitives that represent an input primitive to be rendered based on the tessellation stage-processed version of the input primitive to be rendered. For example, geometry shader 84 may receive vertices indicative of a tessellation stage-processed version of a respective one of a plurality of tessellated primitives that represent an input primitive to be rendered, and generate output vertices that are indicative of a geometry shader stage-processed version of the respective tessellated primitive. In some examples, geometry shader 84 may perform per-primitive processing on the input vertices received from domain shader 82 to generate output vertices. The output vertices may have modified attributes that result from the per-primitive processing, e.g., modified positional attributes. In further examples, geometry shader 84 may be a "pass-through" geometry shader 84 that passes the input vertices directly to the output without performing any substantive processing on the vertices. Geometry shader 84 may pass the output vertices on to rasterizer 86 for further processing.

Rasterizer 86 may generate a rasterized version of each of the plurality of tessellated primitives that represent the input primitive to be rendered based on at least one of a tessellation stage-processed version of the respective tessellated primitive and a geometry shader stage-processed version of the respective primitive that represents the input primitive to be rendered. In some examples, rasterizer 86 may perform high-resolution rasterization of a primitive (e.g., rasterization that is at the resolution to be displayed, which may be higher than the binning pass resolution) to generate a high-resolution rasterized version of the primitive. In further examples, rasterizer 86 may perform back-face culling of the primitive, high-resolution rasterization of the primitive, and high-resolution z-buffering to generate a back-face culled, high resolution, z-buffered rasterized version of the primitive.

In further examples, rasterizer 86 may be configured to have a scissors setting that limits the rasterized pixels that are output by rasterizer 86 to pixel locations that are within the sub-region of the render target that is associated with the rendering pass. In other words, rasterizer 86 may be configured to discard any pixels that are outside of the sub-region of the render target associated with the particular rendering pass.

Pixel shader 88 may generate a pixel shader-processed version of a primitive based on the rasterized version of the primitive received from rasterizer 86. For example, pixel shader 88 may receive one of a plurality of pixels from rasterizer 86 that defines a rasterized version of a primitive, and generate an output pixel based on the pixel. In some examples, pixel shader 88 may perform per-pixel processing on the pixels to generate the output pixels. In further examples, pixel shader 88 may be a "pass-through" pixel shader 88 that generates output pixels without performing any substantive processing on the pixels. Pixel shader 88 passes the output pixels on to output merger 90 for further processing.

Output merger 90 may place pixel data received from pixel shader 88 into a render target. In some examples, output merger 90 may merge the pixel data received from pixel shader 88 with the pixel data already stored in the render target based on a raster operation. For example, output merger 90 may merge the pixel data of a currently processed primitive with pixel data for one or more previously processed primitives to generate a composite, rasterized version of the primitives to be rendered. In some examples, the render target may be binning buffer 36.

Figure 6:
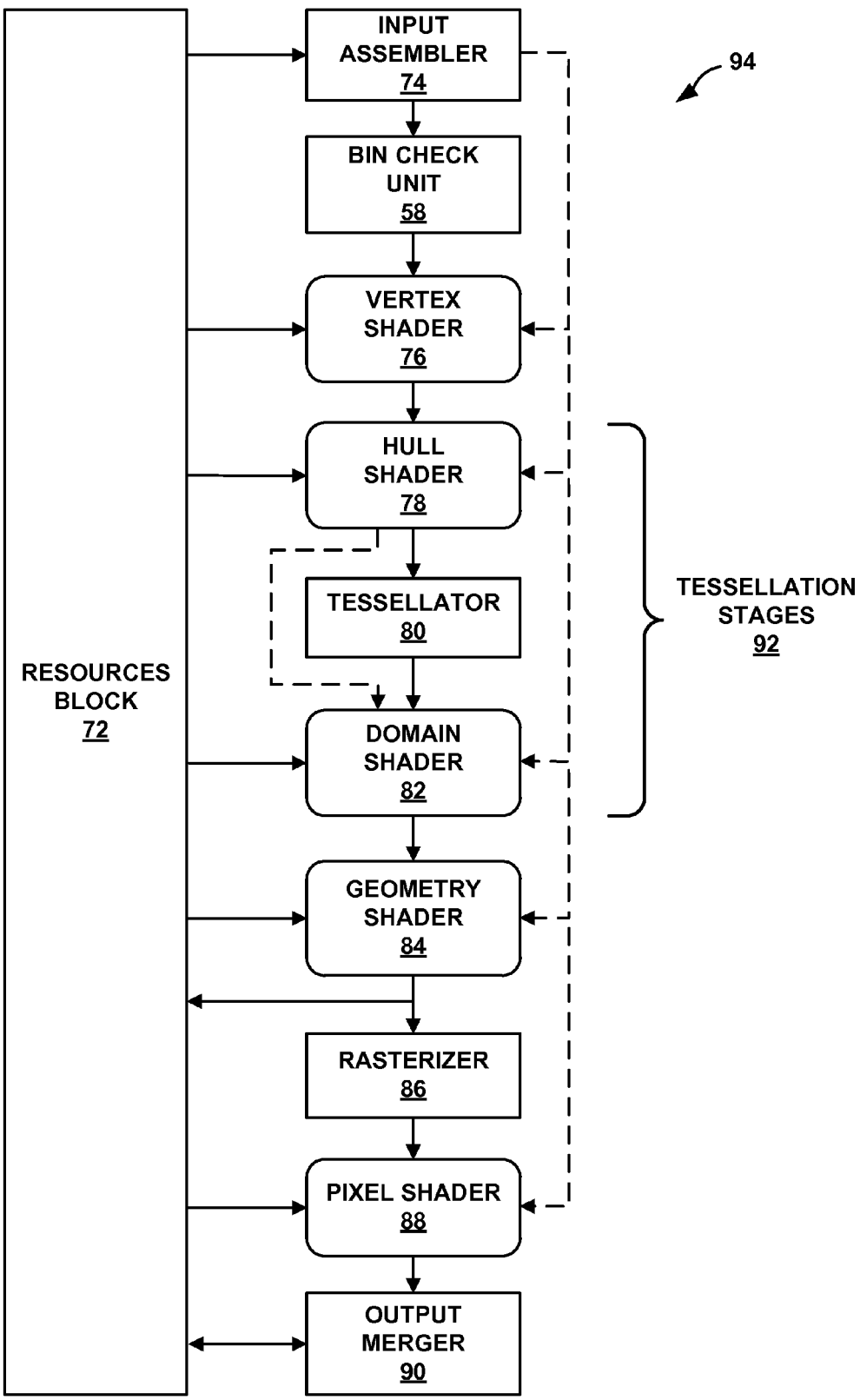
FIG. 6 is a block diagram illustrating another example graphics rendering pipeline according to this disclosure.

FIG. 6 is a block diagram illustrating another example graphics pipeline 94 according to this disclosure. Graphics pipeline 94 is substantially similar to graphics pipeline 70 except that graphics pipeline 94 includes a bin check unit 58 placed between input assembler 74 and vertex shader 76.

Bin check unit 58 may receive vertices that are indicative of all of the primitives to be rendered during a draw call and data indicative of a bin to be rendered, and selectively discard received vertices based on the data indicative of the bin to be rendered. In this way, bin check unit 58 may generate modified primitive data that is specific for a particular bin to be rendered.

FIGS. 7-10 are block diagrams illustrating example configurations of the computing device shown in FIG. 4 according to this disclosure. The block diagrams in FIGS. 7-10 illustrate both binning pass pipeline 60 and rendering pass pipeline 62 as separate components in GPU 12 to conceptually illustrate the different components that may be used to perform tile-based rendering. It should be understood, however, that binning pass pipeline 60 and rendering pass pipeline 62 in each of FIGS. 7-10 may, in some examples, both be implemented by the same set of processing units 34 in GPU 12. Further, it should be understood that, in some examples, binning pass pipeline 60 and rendering pass pipeline 62 may not necessarily both be implemented at the same time. For example, binning pass pipeline 60 may be implemented on processing units 34 during the binning pass, and rendering pass pipeline 62 may be implemented on processing units 34 during the rendering passes.

Figure 7:
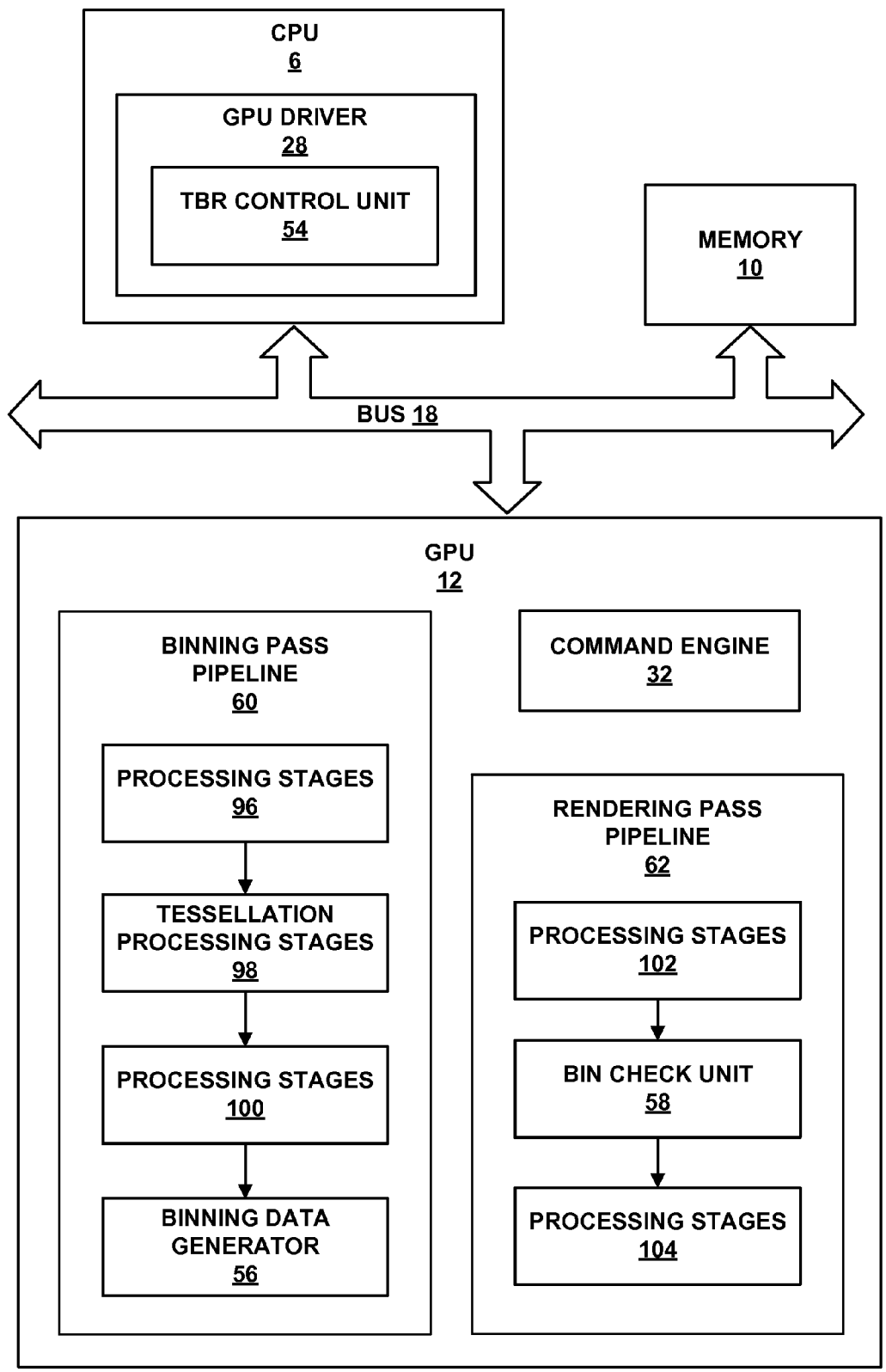
FIGS. 7-10 are block diagrams illustrating example configurations of the computing device shown in FIG. 4 according to this disclosure.

FIG. 7 is a block diagram illustrating an example configuration where a TBR control unit 54 is implemented on GPU driver 28 of CPU 6, a binning data generator 56 is implemented in a binning pass pipeline 60 on GPU 12, and a bin check unit 58 is implemented in a rendering pass pipeline 62 on GPU 12. In response to receiving a draw call from software application 24, TBR control unit 54 may cause binning pass pipeline 60 to perform a binning pass to generate binning data 46 based on the bounding region. Once binning data 46 has been generated, TBR control unit 54 may cause rendering pass pipeline 62 to perform a plurality of rendering passes based on binning data 46. To cause GPU 12 to perform the binning passes and rendering passes, TBR control unit 54 may issue separate draw calls to GPU 12 for each of the rendering passes and the binning pass. For each of the rendering passes, TBR control unit 54 may provide data indicative of the bin to be rendered for the respective rendering pass to bin check unit 58.

As shown in FIG. 7, binning pass pipeline 60 includes one or more pre-tessellation processing stages 96, one or more tessellation processing stages 98, one or more post-tessellation processing stages 100, and a binning data generator 56. In some examples, pre-tessellation processing stages 96 may correspond to input assembler 74 and vertex shader 76 of graphics pipeline 70 shown in FIG. 4, tessellation processing stages 98 may correspond to tessellation stages 92 of graphics pipeline 70 shown in FIG. 4, and post-tessellation processing stages 100 may correspond to geometry shader 84, rasterizer 86, pixel shader 88 and output merger 90 of graphics pipeline 70 shown in FIG. 4. Tessellation processing stages 98 may correspond to one or more tessellation processing stages of an on-chip, tessellation-enabled graphics rendering pipeline.

As also shown in FIG. 7, rendering pass pipeline 62 includes one or more pre-bin check processing stages 102, a bin check unit 58, and one or more post-bin check processing stages 104. In some examples, pre-bin check processing stages 102 may correspond to input assembler 74 of graphics pipeline 94 shown in FIG. 5, and post-bin check processing stages 104 may correspond to vertex shader 76, tessellation stages 92, geometry shader 84, rasterizer 86, pixel shader 88 and output merger 90 of graphics pipeline 94 shown in FIG. 5. Post-bin check processing stages 104 may, in some examples, include one or more tessellation processing stages of an on-chip, tessellation-enabled graphics rendering pipeline.

Pre-tessellation processing stages 96 may perform pre-tessellation processing on a bounding region. Tessellation processing stages 98 may perform tessellation stage processing on the bounding region to generate tessellation stage-processed bounding region data. Post-tessellation processing stages 100 may generate a rasterized version of the bounding region based on the tessellation stage-processed bounding region data. Binning data generator 56 may generate binning data 46 based on the rasterized version of the bounding region.

Pre-bin check processing stages 102 may perform pre-bin check processing on the primitives to be rendered. Bin check unit 58 may selectively discard vertices from rendering pass pipeline 62 based on binning data 46 and data indicative of the bin to be rendered for the current rendering pass (received from TBR control unit 54). Discarding a vertex may involve not passing the vertex on to subsequent post-bin check processing stages 104 for further processing. Similarly, not discarding a vertex may involve passing the vertex on to subsequent post-bin check processing stages 104 for further processing. Post-bin check processing stages 104 may generate a composite, rasterized version of the primitives to be rendered.

Figure 8:
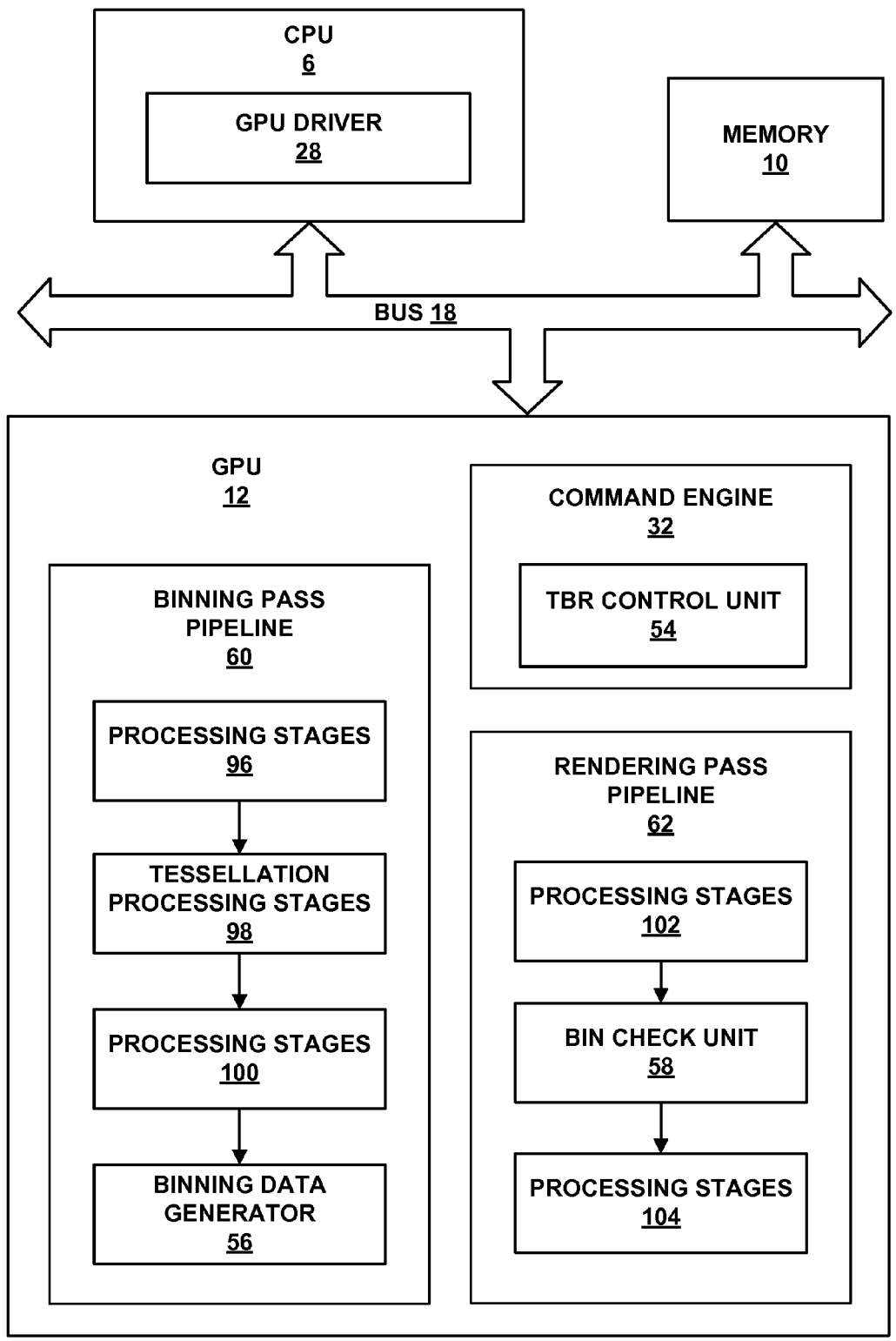

FIG. 8 is a block diagram illustrating an example configuration where a TBR control unit 54 is implemented on GPU 12, a binning data generator 56 is implemented in a binning pass pipeline 60 on GPU 12, and a bin check unit 58 is implemented in a rendering pass pipeline 62 on GPU 12. This configuration operates in a similar manner to the configuration described above with respect to FIG. 7 except that, instead of GPU driver 28 issuing multiple draw calls to GPU 12 for each of the rendering passes and the binning pass in response to receiving a draw call from software application 24, GPU driver 28 may issue a single draw call to GPU 12. Once TBR control unit 54 receives the draw call, TBR control unit 54 may cause GPU 12 to perform the binning pass and the rendering passes for the tile-based rendering without requiring further control from CPU 6.

Figure 9:
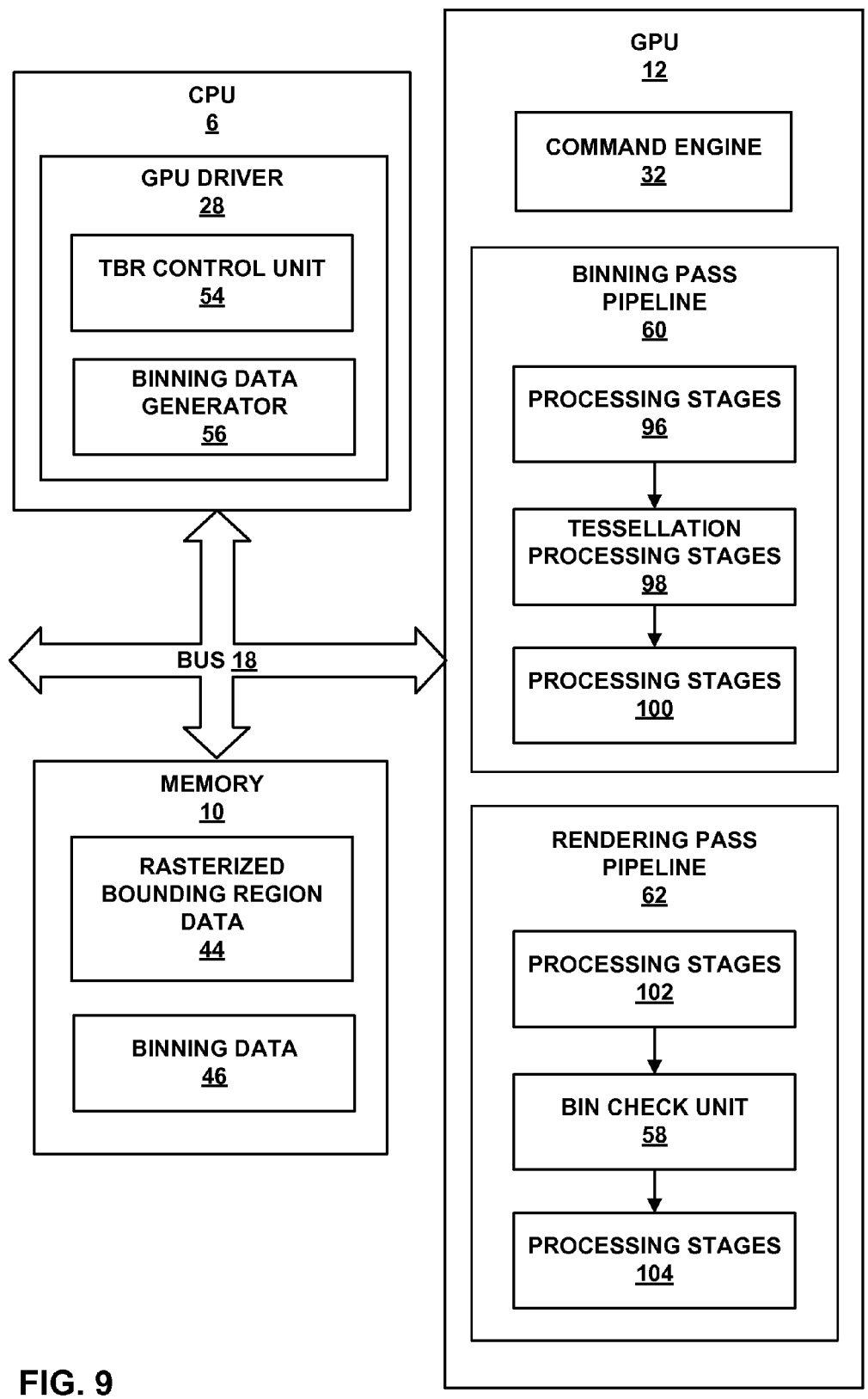

FIG. 9 is a block diagram illustrating an example configuration where a TBR control unit 54 and a binning data generator 56 are implemented on GPU driver 28 of CPU 6, and a bin check unit 58 is implemented in a rendering pass pipeline 62 on GPU 12. This configuration operates in a similar manner to the configuration described above with respect to FIG. 7 except that, instead of binning data generator 56 being implemented on GPU 12 as a part of binning pass pipeline 60, binning data generator 56 is implemented on CPU 6 as a part of GPU driver 28.

In this example, in response to TBR control unit 54 invoking a binning pass, binning pass pipeline 60 may generate a rasterized version of the bounding region, and place the rasterized version of the bounding region into memory 10 as rasterized bounding region data 44. Binning data generator 56, which is executing on CPU 6, may retrieve rasterized bounding region data 44 from memory 10, generate binning data 46 based on rasterized bounding region data 44, and place binning data 46 into memory 10 for further access by GPU 12. The rendering passes may be performed in substantially the same manner as that which was discussed above with respect to FIG. 7.

Figure 10:
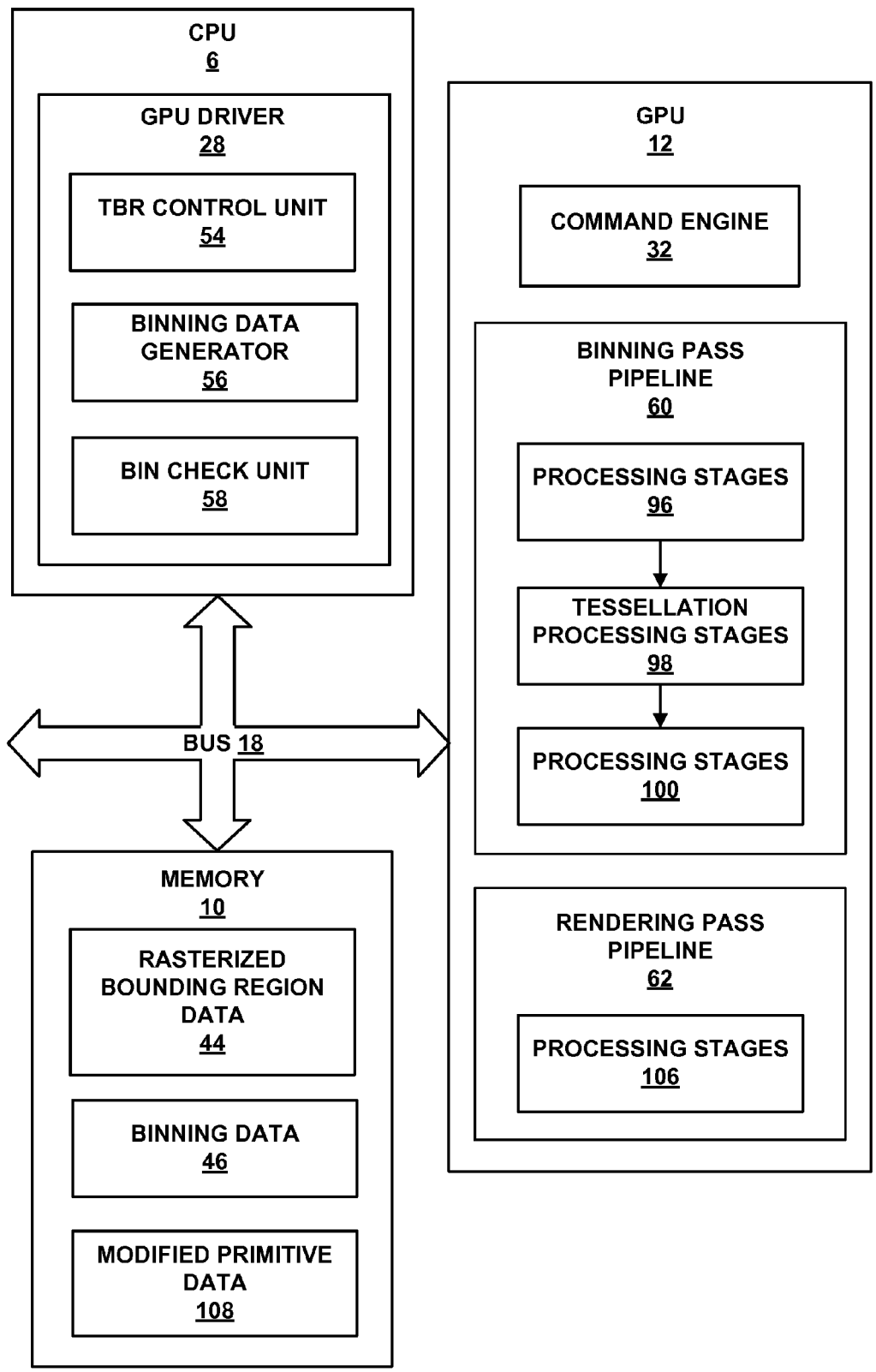

FIG. 10 is a block diagram illustrating an example configuration where a TBR control unit 54, a binning data generator 56, and a bin check unit 58 are implemented on GPU driver 28 of CPU 6. Notably, in this example, rendering pass pipeline 62 does not include a bin check unit 58. Processing stages 106 may, in some examples, correspond to all of the processing stages of graphics pipeline 70 shown in FIG. 4. In this example, binning data 46 is generated in a manner similar to that which was discussed above with respect to FIG. 9.

Because bin check unit 58, however, is implemented on CPU 6 in this example, the modified primitive data is generated by CPU 6 prior to performing each of the rendering passes rather than being generated during the rendering passes as described above in FIGS. 7-9. Thus, bin check unit 58 may generate modified primitive data 108 for each of the rendering passes to be performed based on the bin to be rendered during the respective rendering pass, binning data 46, and primitive data 40 (FIG. 2).

Figure 11:
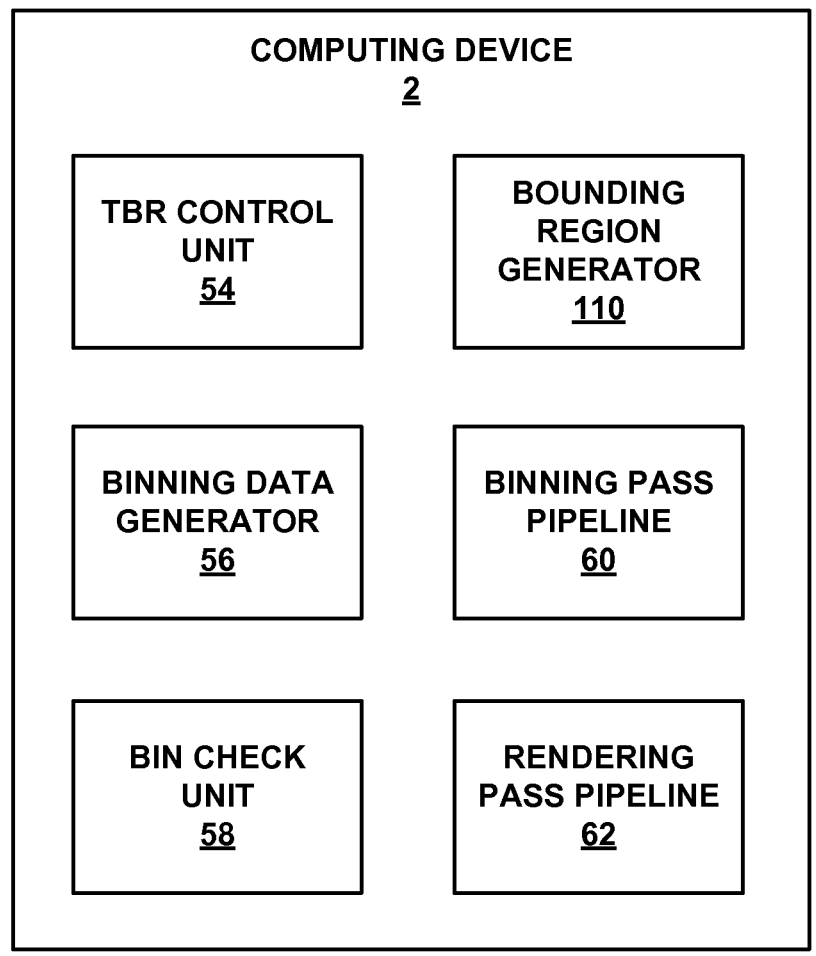
FIG. 11 is a block diagram illustrating another example of tile-based rendering components that may be used to implement the tile-based rendering techniques of this disclosure.

FIG. 11 is a block diagram illustrating another example of tile-based rendering components that may be used to implement the tile-based rendering techniques of this disclosure. The components of computing device 2 shown in FIG. 11 are substantially similar to the components of computing device 2 shown in FIG. 4 except that the computing device in FIG. 11 includes a bounding region generator 110 in addition to the other components shown in FIG. 4.

Bounding region generator 110 may receive data indicative of one or more primitives to be rendered (e.g., from TBR control unit 54 and/or from memory 10), and generate a bounding region that encompasses the one or more primitives to be rendered. In some examples, bounding region generator 110 may generate a single bounding region that encompasses all of the primitives to be rendered during a single draw call. In further examples, bounding region generator 110 may generate multiple bounding regions where each bounding region encompasses a respective one of a plurality of subsets of a plurality of primitives to be rendered.

In further examples, bounding region generator 110 may receive data indicative of a higher-order primitive to be rendered (e.g., a higher-order surface, such as, for example, a Bézier surface, a non-uniform rational basis spline (NURBS), etc.). In some examples, in order to render the higher-order primitive, GPU 12 may tessellate the primitive into a plurality of low-order, tessellated primitives, and render each of the tessellated primitives. In such examples, bounding region generator 110 may generate a bounding region that encompasses the higher-order surface. A bounding region that encompasses the higher-order surface may be a bounding region that encompasses all of the tessellated primitives that will be generated based on the higher-order surface during the rendering passes. In some examples, bounding region generator 110 may generate the bounding region to correspond to the convex hull of a higher-order surface.

The techniques shown in FIGS. 12-16 are described as being performed by CPU 6 and/or GPU 12 shown in FIGS. 1 & 2 for exemplary purposes. In other examples, the techniques illustrated in FIGS. 12-16 may be implemented in other systems that have same or different components in the same or a different configuration.

Figure 12:
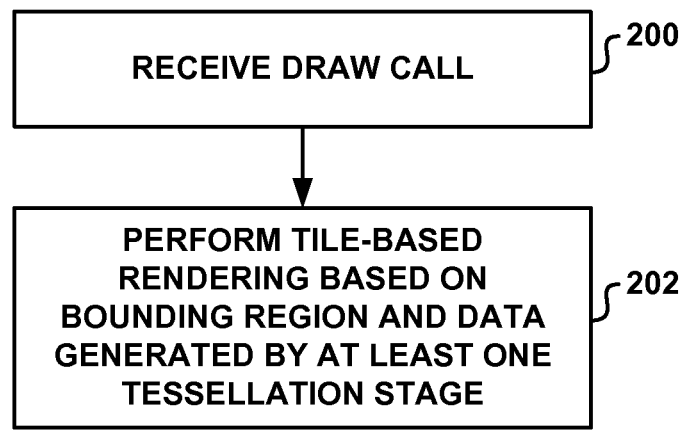
FIG. 12 is a flow diagram illustrating an example technique for performing tile-based rendering according to this disclosure.

FIG. 12 is a flow diagram illustrating an example technique for performing tile-based rendering according to this disclosure. CPU 6 and/or GPU 12 receive a draw call command (200). For example, TBR control unit 54 may receive a draw call command from a software application executing on GPU 12. The draw call command may instruct CPU 6 and/or GPU 12 to render one or more graphics primitives using GPU 12. In response to receiving the draw call command, CPU 6 and/or GPU 12 perform tile-based rendering for the one or more graphics primitives based on a bounding region that encompasses the one or more graphics primitives and based on data that is generated by at least one tessellation processing stage of an on-chip, tessellation-enabled, graphics pipeline that is implemented by GPU 12 (202).

In some examples, to the perform tile-based rendering for the one or more graphics primitives, CPU 6 and/or GPU 12 may generate binning data based on the bounding region and the data that is generated by the least one tessellation processing stage of the on-chip, tessellation-enabled graphics pipeline. The binning data may indicate to which of a plurality of sub-regions of a render target a rasterized version of the bounding region contributes pixel data. In such examples, CPU 6 and/or GPU 12 may perform a plurality of rendering passes based on the binning data. Each of the rendering passes may be performed for a respective one of the sub-regions of the render target.

In further examples, to generate the binning data based on the bounding region and the data that is generated by the least one tessellation processing stage of the on-chip, tessellation-enabled graphics rendering pipeline, GPU 12 (e.g., binning pass pipeline 60) may generate a rasterized version of the bounding region based on the data that is generated by the least one tessellation processing stage of the on-chip, tessellation-enabled graphics rendering pipeline. In such examples, CPU 6 and/or GPU 12 (e.g., binning data generator 56) may generate the binning data based on the rasterized version of the bounding region.

In additional examples, the data that is generated by the at least one tessellation processing stage of the on-chip, tessellation-enabled graphics rendering pipeline may include tessellation stage-processed positional coordinates of the bounding region. In such examples, to generate the rasterized version of the binning data, GPU 12 (e.g., binning pass pipeline 60) may generate the tessellation stage-processed positional coordinates of the bounding region using the at least one tessellation processing stage of the on-chip, tessellation-enabled, graphics rendering pipeline that is implemented by GPU 12, and rasterize the bounding region based on the tessellation stage-processed positional coordinates.

In some examples, the one or more graphics primitives that are part of the draw call may be a first set of graphics primitives. In such examples, the bounding region may be formed by a second set of one or more graphics primitives. In such examples, to generate the rasterized version of the bounding region, GPU 12 (e.g., binning pass pipeline 60) may rasterize the second set of one or more graphics primitives based on the data that is generated by the least one tessellation processing stage of the on-chip, tessellation-enabled graphics rendering pipeline, and generate the rasterized version of the bounding region based on the rasterized second set of one of more graphics primitives.

To rasterize the second set of one or more graphics primitives, GPU 12 (e.g., rasterizer 86) may, in some examples, generate a rasterized version of each of the graphics primitives in the second set of graphics primitives. For each of the graphics primitives, the rasterized version of the respective graphics primitive may be a set of pixels that spatially correspond to the respective graphics primitive. In such examples, GPU 12 may generate the rasterized bounding region based on the rasterized versions of the graphics primitives in the second set of graphics primitives. For example, GPU 12 (e.g., output merger 90) may merge and/or composite the rasterized versions of the individual primitives in the second set of graphics primitives into a single composite, rasterized version of the second set of primitives. The composite, rasterized version of the second set of primitives, in such examples, may correspond to the rasterized version of the bounding region.

In further examples, to rasterize the second set of one or more graphics primitives, GPU 12 (e.g., rasterizer 86) may, in some examples, cull graphics primitives in the second set of graphics primitives that are back-facing, perform low-resolution rasterization for graphics primitives in the second set of graphics primitives that are not back-facing to generate low-resolution rasterized versions of the graphics primitives, and generate a set of low-resolution, depth-buffered pixels based on the low-resolution rasterized versions of the graphics primitives and a low-resolution depth test. In such examples, GPU 12 may generate the rasterized version of the bounding region based on the set of low-resolution, depth-buffered pixels. For example, GPU 12 (e.g., output merger 90) may merge and/or composite the rasterized versions of the individual primitives in the second set of graphics primitives into a composite, low-resolution, rasterized version of the second set of primitives. The composite, low-resolution, rasterized version of the second set of primitives, in such examples, may correspond to the rasterized version of the bounding region.

In some examples, to generate the binning data, CPU 6 and/or GPU 12 (e.g., binning data generator 58) may determine to which of the plurality of sub-regions of the render target the bounding region contributes pixel data, and generate the binning data for the one or more primitives based on the determined sub-regions of the render target to which the bounding region contributes pixel data.

To perform the plurality of rendering passes, in some examples, GPU 12 (e.g., rendering pass pipeline 62) may, for each of the rendering passes, selectively render or not render each of the one or more primitives to be rendered as part of the draw call during the respective rendering pass based on the binning data. To selectively render or not render each of the one or more primitives, GPU 12 (e.g., rendering pass pipeline 62) may, for each of the one or more primitives to be render, render the respective primitive during the respective rendering pass if the binning data indicates that a bounding region associated with the respective primitive contributes pixel data to a respective one of the sub-regions of the render target that is associated with the respective rendering pass. Similarly, GPU 12 (e.g., rendering pass pipeline 62) may, for each of the one or more primitives, not render the respective primitive during the respective rendering pass if the binning data indicates that the bounding region associated with the respective primitive does not contribute pixel data to the respective one of the sub-regions of the render target that is associated with the respective rendering pass.

In some examples, to selectively render or not render each of the one or more primitives, GPU 12 (e.g., bin check unit 58 of rendering pass pipeline 62) may selectively discard or not discard portions of data indicative of the one or more graphics primitives to be rendered based on the binning data. For example, GPU 12 (e.g., bin check unit 58) may, for each of the one or more primitives, discard data indicative of the respective primitive during the respective rendering pass if the binning data indicates that the bounding region associated with the respective primitive does not contribute pixel data to the respective one of the sub-regions of the render target that is associated with the respective rendering pass. Similarly, GPU 12 (e.g., bin check unit 58) may, for each of the one or more primitives, not discard data indicative of the respective primitive during the respective rendering pass if the binning data indicates that the bounding region associated with the respective primitive contributes pixel data to the respective one of the sub-regions of the render target that is associated with the respective rendering pass.

Discarding portions of data may include not passing such data on to subsequent stages of rendering pass pipeline 62. Likewise, not discarding portions of the data may include passing such data on to subsequent stages of rendering pass pipeline 62.

In further examples, to perform the plurality of rendering passes CPU 6 and/or GPU 12 (e.g., bin check unit 58) may, for each of the rendering passes, selectively discard or not discard portions of data indicative of the one or more graphics primitives to be rendered based on the binning data to generate modified primitive data for the respective rendering pass. In such examples, GPU 12 may, for each of the rendering passes, perform the respective rendering pass based on the modified primitive data for the respective rendering pass. In other words, the modified primitive data for a respective rendering pass may be used as the source data for the rendering pass.

In further examples, to perform the plurality of rendering passes GPU 12 (e.g., rendering pass pipeline 62) may, for each of the one or more primitives that are to be rendered, tessellate the respective primitive into a plurality of tessellated primitives. In such examples, GPU 12 (e.g., rendering pass pipeline 62) may, for each of the one or more primitives that are to be rendered, render the tessellated primitives into a render target (e.g., binning buffer 36).

In some examples, the bounding region may be received by GPU 12 from a host processor (e.g., CPU 6). In some cases, the bounding region may be provided by one or more of software application 24 and GPU driver 28.

In some examples, the one or more primitives to be rendered during the draw call may include a higher-order surface that is defined by a plurality of control points. In such examples, the bounding region may correspond to a convex hull that is determined based on the control points that define the higher-order surface.

In further examples, the one or more primitives to be rendered as part of a draw call may include two or more primitives to be rendered, and the bounding region may correspond to a bounding volume that encompasses the two or more primitives.

In additional examples, the bounding region provided to GPU 12 may be a bounding region that is used by a graphics application for collision detection. In more examples, the bounding region provided to GPU 12 may be a bounding region that is used by a graphics application for clipping.

Figure 13:
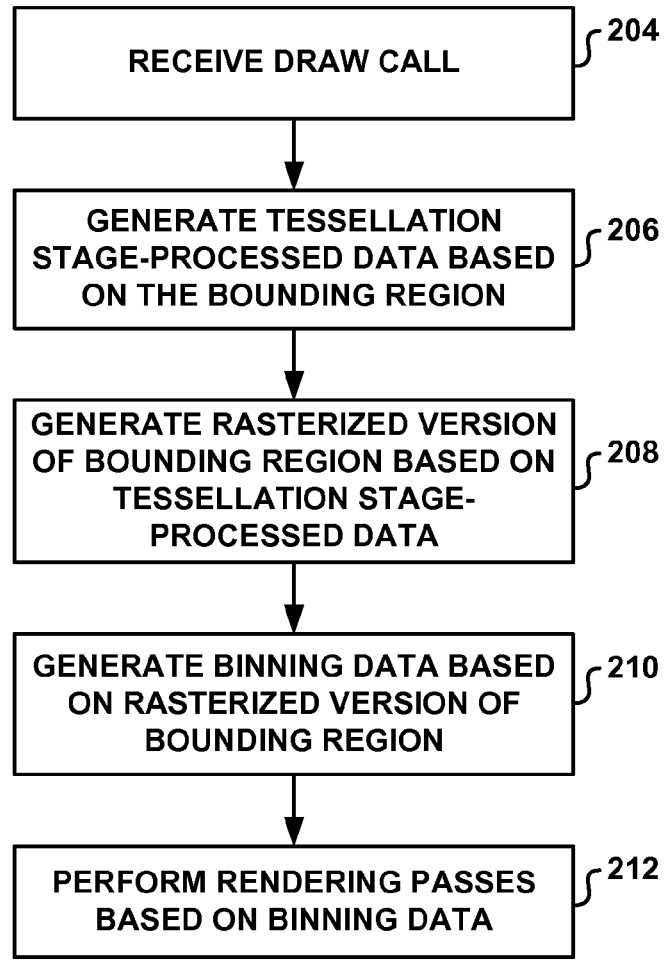
FIG. 13 is a flow diagram illustrating another example technique for performing tile-based rendering according to this disclosure.

FIG. 13 is a flow diagram illustrating another example technique for performing the tile-based rendering techniques of this disclosure. In some examples, the technique illustrated in FIG. 13 may be used to perform the technique illustrated in FIG. 12.

CPU 6 and/or GPU 12 receives a draw call. For example, TBR control unit 54 may receive a draw call command from a software application executing on GPU 12 (204). The draw call may instruct CPU 6 and/or GPU 12 to render one or more graphics primitives using GPU 12. In some examples, a bounding region that encompasses one or more of the primitives to be rendered may be provided with the draw call. In further examples, CPU 6 and/or GPU 12 (bounding region generator 110) may generate a bounding region that encompasses the one or more primitives to be rendered based on the primitives to be rendered as part of the draw call.

GPU 12 (e.g., tessellation processing stages 98 of binning pass pipeline 60) may generate tessellation stage-processed data based on the bounding region (206). For example, GPU 12 may process the bounding region using at least one tessellation processing stage of an on-chip, tessellation-enabled graphics rendering pipeline to generate the tessellation stage-processed data. In some examples, GPU 12 may process positional coordinates the bounding region (e.g., positional coordinates of primitives that define the bounding region) using the at least one tessellation processing stage of the on-chip, tessellation-enabled graphics rendering pipeline to generate the tessellation stage-processed positional coordinates for the bounding region.

GPU 12 (e.g., post-tessellation processing stages 100 of binning pass pipeline 60) may generate a rasterized version of the bounding region based on the tessellation stage-processed data (208). For example, GPU 12 (e.g., post-tessellation processing stages 100 of binning pass pipeline 60) may rasterize each of the individual primitives that form the bounding region to generate rasterized versions of the individual primitives, and may composite and/or merge the rasterized versions of the individual primitives into a single, composite, rasterized version of the primitives that form the bounding region. The single, composite, rasterized version of the primitives that form the bounding region may correspond to a rasterized version of the bounding region.

CPU 6 and/or GPU 12 (e.g., binning data generator 56) may generate binning data based on the rasterized version of the bounding region (210). In some examples, the binning data may indicate to which of a plurality of sub-regions of a render target (e.g., bins of a render target) the bounding regions contributes pixel data (e.g. image data).

CPU 6 and/or GPU 12 may perform the rendering passes based on the binning data (212). Once the rendering passes are complete, the render target may store a composite, rasterized version of the primitives to be rendered as part of the draw call.

In some examples, GPU 12 (e.g., rendering pass pipeline 62) may, for each of the rendering passes, receive the binning data, data indicative of the sub-region of the render target associated with the respective rendering pass, and data indicative of the primitives to be rendered as part of the draw call. In such examples, GPU 12 (e.g., rendering pass pipeline 62) may selectively render or not render primitives included in the data indicative of the primitives to be rendered as part of the draw call based on the binning data, and the data indicative of the sub-region of the render target associated with the respective rendering pass.

In further examples, CPU 6 (e.g., bin check unit 58) may generate modified primitive data for each of the rendering passes based on the binning data, data indicative of the sub-region of the render target associated with the respective rendering pass, and data indicative of the primitives to be rendered as part of the draw call. For example, CPU 6 (e.g., bin check unit 58) may selectively discard portions of the data indicative of the primitives to be rendered based on the binning data and the data indicative of the sub-region of the render target associated with the respective rendering pass. To perform the rendering passes, GPU 12 (e.g., rendering pass pipeline 62) may, for each of the rendering passes, receive modified primitive data associated with respective rendering pass, and render the primitives included in the modified primitive data.

Figure 14:
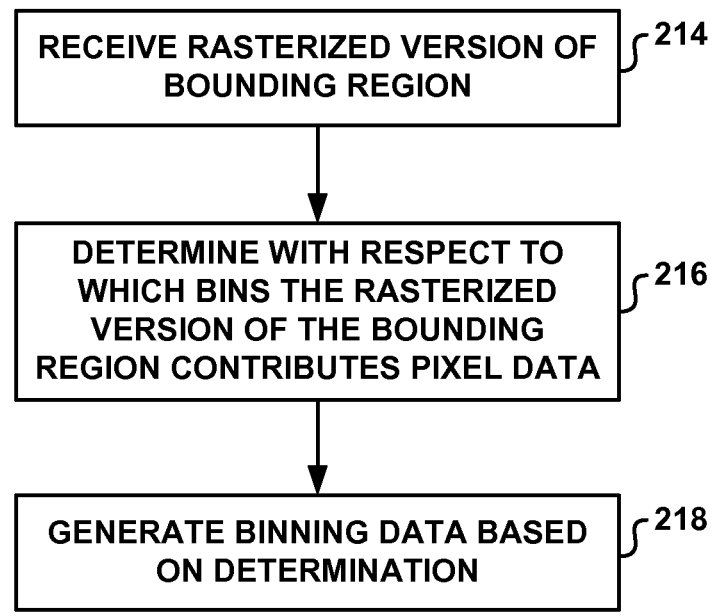
FIG. 14 is a flow diagram illustrating an example technique for generating binning data according to this disclosure.

FIG. 14 is a flow diagram illustrating an example technique for generating binning data according to this disclosure. In some examples, the technique shown in FIG. 14 may be used to perform process box 210 shown in FIG. 13.

CPU 6 and/or GPU 12 (e.g., binning data generator 56) may receive data indicative of a rasterized version of a bounding region (214). CPU 6 and/or GPU 12 (e.g., binning data generator 56) may determine with respect to which bins (i.e., sub-regions of a render target) the rasterized version of the bounding region contributes pixel data (216).

For example, if the rasterized version of the bounding region includes pixels located in a respective one of the bins of the render target, then binning data generator 56 may determine that the rasterized version of the bounding region contributes pixel data to the respective one of the bins of the render target. Similarly, if the rasterized version of the bounding region does not include pixels located in a respective one of the bins of the render target, then binning data generator 56 may determine that the rasterized version of the bounding region does not contribute pixel data to the respective one of the bins of the render target.

CPU 6 and/or GPU 12 (e.g., binning data generator 56) may generate the binning data based on the determination (218). For example, binning data generator 56 may generate the binning data such that the binning data indicates to which of the bins the bounding region contributes pixel data. The binning data may, in some examples, be vertex-indexed binning data, primitive-indexed binning data, and/or bounding region-indexed binning data as described in this disclosure.

Figure 15:
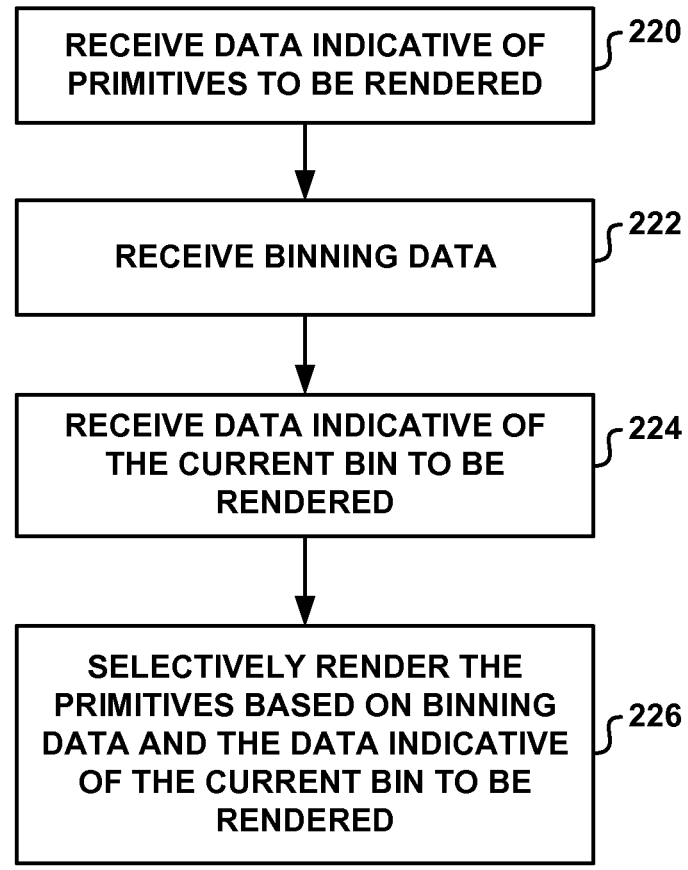
FIG. 15 is a flow diagram illustrating an example technique for performing a rendering pass according to this disclosure.

FIG. 15 is a flow diagram illustrating an example technique for performing a rendering pass according to this disclosure. In some examples, the technique shown in FIG. 15 may be used to perform process box 212 shown in FIG. 13.

GPU 12 (e.g., rendering pass pipeline 62) receives data indicative of one or more primitives to be rendered as part of a draw call (220). GPU 12 (e.g., rendering pass pipeline 62) receives binning data (222). GPU 12 (e.g., rendering pass pipeline 62) receives data indicative of a current bin to be rendered during a particular rendering pass (224). GPU 12 (e.g., rendering pass pipeline 62) selectively renders or not renders the primitives included in the data indicative of the one or more primitives to be rendered based on the binning data and the data indicative of the current bin to be rendered (226).

Figure 16:
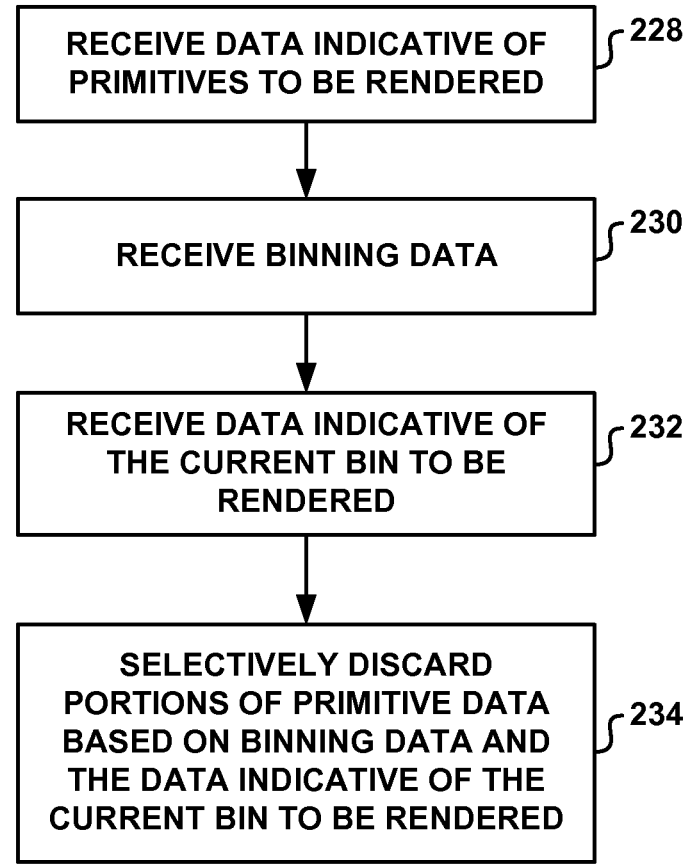
FIG. 16 is a flow diagram illustrating an example technique for generating modified primitive data to be rendered during a rendering pass according to this disclosure.

FIG. 16 is a flow diagram illustrating an example technique for generating modified primitive data to be rendered during a rendering pass according to this disclosure. In some examples, the technique shown in FIG. 16 may be used to perform process box 212 shown in FIG. 13. In further examples, the technique shown in FIG. 16 may be used to perform process box 226 shown in FIG. 15.

CPU 6 and/or GPU 12 (e.g., bin check unit 58) receives data indicative of one or more primitives to be rendered as part of a draw call (228). CPU 6 and/or GPU 12 (e.g., bin check unit 58) receives binning data (230). CPU 6 and/or GPU 12 (e.g., bin check unit 58) receives data indicative of a current bin to be rendered during a particular rendering pass (232). CPU 6 and/or GPU 12 (e.g., bin check unit 58) selectively discards or does not discard the primitives included in the data indicative of the one or more primitives to be rendered based on the binning data and the data indicative of the current bin to be rendered (234).

In some examples, bin check unit 58 may be a part of rendering pass pipeline 62 implemented in GPU 12. In further examples, bin check unit 58 may be a part of CPU 6 (e.g., GPU driver 28).

Vertex processing on a DX11 graphics pipeline can be much more expensive than on previous APIs, especially when tessellation is in use. TBR architectures may be especially sensitive to vertex processing because the vertices may be evaluated on the binning pass for each vertex, then again for each bin that a primitive appears in. For highly tessellated objects, each vertex may be fully processed twice, once for the binning pass, and once for the 1 bin in which the primitive containing the vertex resides.

In some examples, the techniques of this disclosure may pass in a pre-transformed bounding volume. The GPU hardware may process, in some examples, the vertices of the bounding region in the binning pass to generate visibility information for the object being bounded. In some examples, for highly tessellated objects, a TBR may transform the bounding volume (it could be a sphere, or rectangular prism) for the binning pass, and in many cases, may process 1 vertex per bin. In some examples, the bounding volume may take displacement mapping into consideration.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method comprising:
    performing, with one or more processors, tile-based rendering for one or more graphics primitives, wherein the tile based rendering comprises:
        determining a bounding region that encompasses the one or more graphics primitives, including generating a rasterized version of the bounding region;
        generating binning data for a plurality of sub-regions that are each separate from the rasterized version of the bounding region, the binning data being based on the rasterized version of the bounding region and based on data that is generated by at least one tessellation processing stage of an on-chip, tessellation-enabled, graphics rendering pipeline that is implemented by a graphics processing unit (GPU), the binning data not being based on the one or more graphics primitives, the binning data indicating to which of the plurality of sub-regions of a render target the rasterized version of the bounding region contributes pixel data; and
        performing a plurality of rendering passes based on the binning data, each of the rendering passes being performed for a respective one of the sub-regions of the render target.

2. The method of claim 1, wherein generating the rasterized version of the bounding region further comprises:
    generating the rasterized version of the bounding region based on the data that is generated by the least one tessellation processing stage of the on-chip, tessellation-enabled graphics rendering pipeline.

3. The method of claim 2,
    wherein the data that is generated by the at least one tessellation processing stage of the on-chip, tessellation-enabled graphics rendering pipeline comprises tessellation stage-processed positional coordinates of the bounding region, and
    wherein generating the rasterized version of the binning data comprises:
        generating the tessellation stage-processed positional coordinates of the bounding region using the at least one tessellation processing stage of the on-chip, tessellation-enabled, graphics rendering pipeline that is implemented by the GPU; and
        rasterizing the bounding region based on the tessellation stage-processed positional coordinates to generate the rasterized version of the bounding region.

4. The method of claim 2, wherein the one or more graphics primitives are a first set of graphics primitives, wherein the bounding region is formed by a second set of one or more graphics primitives, and wherein generating the rasterized version of the bounding region comprises:

rasterizing the second set of one or more graphics primitives based on the data that is generated by the least one tessellation processing stage of the on-chip, tessellation-enabled graphics rendering pipeline; and generating the rasterized version of the bounding region based on the rasterized second set of one of more graphics primitives.

5. The method of claim 4, wherein rasterizing the second set of one or more graphics primitives comprises:

culling graphics primitives in the second set of graphics primitives that are back-facing;

performing low-resolution rasterization for graphics primitives in the second set of graphics primitives that are not back-facing to generate low-resolution rasterized versions of the graphics primitives; and generating a set of low-resolution, depth-buffered pixels based on the low-resolution rasterized versions of the graphics primitives and a low-resolution depth test, and wherein generating the rasterized version of the bounding region comprises generating the rasterized version of the bounding region based on the set of low-resolution, depth-buffered pixels.

6. The method of claim 2, wherein generating the binning data based on the rasterized version of the bounding region comprises:

determining to which of the plurality of sub-regions of the render target the bounding region contributes pixel data based on the rasterized version of the bounding region; and generating the binning data for the one or more graphics primitives based on the determined sub-regions of the render target to which the bounding region contributes pixel data.

7. The method of claim 1, wherein generating the binning data comprises:

determining to which of the plurality of sub-regions of the render target the bounding region contributes pixel data; and generating the binning data for the one or more graphics primitives based on the determined sub-regions of the render target to which the bounding region contributes pixel data.

8. The method of claim 1, wherein performing the plurality of rendering passes comprises:

for each of the rendering passes, selectively rendering or not rendering each of the one or more graphics primitives during the respective rendering pass based on the binning data.

9. The method of claim 8, wherein selectively rendering or not rendering each of the one or more graphics primitives comprises:

for each of the one or more graphics primitives, rendering the respective graphics primitive during the respective rendering pass if the binning data indicates that a bounding region associated with the respective graphics primitive contributes pixel data to a respective one of the sub-regions of the render target that is associated with the respective rendering pass; and for each of the one or more graphics primitives, not rendering the respective graphics primitive during the respective rendering pass if the binning data indicates that the bounding region associated with the respective graphics primitive does not contribute pixel data to the respective one of the sub-regions of the render target that is associated with the respective rendering pass.

10. The method of claim 1, further comprising:

for each of the rendering passes, selectively discarding or not discarding portions of data indicative of the one or more graphics primitives to be rendered based on the binning data to generate modified primitive data for the respective rendering pass, wherein performing the plurality of rendering passes comprises, for each of the rendering passes, performing the respective rendering pass based on the modified primitive data for the respective rendering pass.

11. The method of claim 10, wherein selectively discarding or not discarding portions of data indicative of the one or more graphics primitives to be rendered comprises:

for each of the one or more graphics primitives, not discarding the respective graphics primitive for the respective rendering pass if the binning data indicates that a bounding region associated with the respective graphics primitive contributes pixel data to a respective one of the sub-regions of the render target that is associated with the respective rendering pass; and for each of the one or more graphics primitives, discarding the respective graphics primitive for the respective rendering pass if the binning data indicates that the bounding region associated with the respective graphics primitive does not contribute pixel data to the respective one of the sub-regions of the render target that is associated with the respective rendering pass.

12. The method of claim 1, wherein performing the plurality of rendering passes comprises:

for each of the one or more primitives that are to be rendered, tessellating the respective primitive into a plurality of tessellated primitives; and rendering the tessellated primitives into the render target.

13. The method of claim 1, wherein determining the bounding region comprises determining a bounding region that is received by the GPU from a host processor.

14. The method of claim 1, wherein the one or more primitives comprises a higher-order surface that is defined by a plurality of control points, and the bounding region comprises a convex hull that is determined based on the control points that define the higher-order surface.

15. The method of claim 1, wherein the one or more primitives comprises two or more primitives, and the bounding region comprises a volume that encompasses the two or more primitives.

16. The method of claim 1, wherein the bounding region comprises a bounding region that is used by a graphics application for collision detection.

17. The method of claim 1, wherein the bounding region comprises a bounding region that is used by a graphics application for clipping.

18. The method of claim 1, wherein the bounding region comprises at least one of a bounding sphere and a bounding rectangular prism.

19. A device comprising:

a memory configured to store one or more graphics primitives; and one or more processors configured to perform tile-based rendering for the one or more graphics primitives, wherein to perform the tile-based rendering, the one or more processors are configured to:

determine a bounding region that encompasses the one or more graphics primitives, including generating a rasterized version of the bounding region;

generate binning data for a plurality of sub-regions that are each separate from the rasterized version of the bounding region, the binning data being based on the rasterized version of the bounding region and based on data that is generated by at least one tessellation processing stage of an on-chip, tessellation-enabled, graphics rendering pipeline that is implemented by a graphics processing unit (GPU), the binning data not being based on the one or more graphics primitives the binning data indicating to which of the plurality of sub-regions of a render target the rasterized version of the bounding region contributes pixel data; and perform a plurality of rendering passes based on the binning data, each of the rendering passes being performed for a respective one of the sub-regions of the render target.

20. The device of claim 19, wherein the one or more processors are further configured to:

generate the rasterized version of the bounding region based on the data that is generated by the least one tessellation processing stage of the on-chip, tessellation-enabled graphics rendering pipeline.

21. The device of claim 20, wherein the data that is generated by the at least one tessellation processing stage of the on-chip, tessellation-enabled graphics rendering pipeline comprises tessellation stage-processed positional coordinates of the bounding region, and wherein the one or more processors are further configured to:

generate the tessellation stage-processed positional coordinates of the bounding region using the at least one tessellation processing stage of the on-chip, tessellation-enabled, graphics rendering pipeline that is implemented by the GPU; and rasterize the bounding region based on the tessellation stage-processed positional coordinates to generate the rasterized version of the bounding region.

22. The device of claim 20, wherein the one or more graphics primitives are a first set of graphics primitives, wherein the bounding region is formed by a second set of one or more graphics primitives, and wherein the one or more processors are further configured to:

rasterize the second set of one or more graphics primitives based on the data that is generated by the least one tessellation processing stage of the on-chip, tessellation-enabled graphics rendering pipeline; and generate the rasterized version of the bounding region based on the rasterized second set of one of more graphics primitives.

23. The device of claim 22, wherein the one or more processors are further configured to:

cull graphics primitives in the second set of graphics primitives that are back-facing;

perform low-resolution rasterization for graphics primitives in the second set of graphics primitives that are not back-facing to generate low-resolution rasterized versions of the graphics primitives;

generate a set of low-resolution, depth-buffered pixels based on the low-resolution rasterized versions of the graphics primitives and a low-resolution depth test; and generate the rasterized version of the bounding region based on the set of low-resolution, depth-buffered pixels.

24. The device of claim 20, wherein the one or more processors are further configured to:

determine to which of the plurality of sub-regions of the render target the bounding region contributes pixel data based on the rasterized version of the bounding region; and generate the binning data for the one or more graphics primitives based on the determined sub-regions of the render target to which the bounding region contributes pixel data.

25. The device of claim 19, wherein the one or more processors are further configured to:

determine to which of the plurality of sub-regions of the render target the bounding region contributes pixel data; and generate the binning data for the one or more graphics primitives based on the determined sub-regions of the render target to which the bounding region contributes pixel data.

26. The device of claim 19, wherein the one or more processors are further configured to:

for each of the rendering passes, selectively render or not render each of the one or more graphics primitives during the respective rendering pass based on the binning data.

27. The device of claim 26, wherein the one or more processors are further configured to:

for each of the one or more graphics primitives, render the respective graphics primitive during the respective rendering pass if the binning data indicates that a bounding region associated with the respective graphics primitive contributes pixel data to a respective one of the sub-regions of the render target that is associated with the respective rendering pass; and for each of the one or more graphics primitives, not render the respective graphics primitive during the respective rendering pass if the binning data indicates that the bounding region associated with the respective graphics primitive does not contribute pixel data to the respective one of the sub-regions of the render target that is associated with the respective rendering pass.

28. The device of claim 19, wherein the one or more processors are further configured to:

for each of the rendering passes, selectively discard or not discard portions of data indicative of the one or more graphics primitives to be rendered based on the binning data to generate modified primitive data for the respective rendering pass, for each of the rendering passes, perform the respective rendering pass based on the modified primitive data for the respective rendering pass.

29. The device of claim 28, wherein the one or more processors are further configured to:

for each of the one or more graphics primitives, not discard the respective graphics primitive for the respective rendering pass if the binning data indicates that a bounding region associated with the respective graphics primitive contributes pixel data to a respective one of the sub-regions of the render target that is associated with the respective rendering pass; and for each of the one or more graphics primitives, discard the respective graphics primitive for the respective rendering pass if the binning data indicates that the bounding region associated with the respective graphics primitive does not contribute pixel data to the respective one of the sub-regions of the render target that is associated with the respective rendering pass.

30. The device of claim 19, wherein the one or more processors are further configured to:

for each of the one or more primitives that are to be rendered, tessellate the respective primitive into a plurality of tessellated primitives; and render the tessellated primitives into the render target.

31. The device of claim 19, wherein to determine the bounding region, the one or more processors are configured to determine a bounding region that is received by the GPU from a host processor.

32. The device of claim 19, wherein the one or more primitives comprise a higher-order surface that is defined by a plurality of control points, and the bounding region comprises a convex hull that is determined based on the control points that define the higher-order surface.

33. The device of claim 19, wherein the one or more primitives comprise two or more primitives, and the bounding region comprises a volume that encompasses the two or more primitives.

34. The device of claim 19, wherein the bounding region comprises a bounding region that is used by a graphics application for collision detection.

35. The device of claim 19, wherein the bounding region comprises a bounding region that is used by a graphics application for clipping.

36. The device of claim 19, wherein the bounding region comprises at least one of a bounding sphere and a bounding rectangular prism.

37. The device of claim 19, wherein the device comprises a wireless communication device.

38. The device of claim 19, wherein the device comprises a mobile phone handset.

39. An apparatus comprising:
means for receiving data indicative of one or more graphics primitives to be rendered; and
means for performing tile-based rendering for the one or more graphics primitives, wherein the tile based rendering comprises:
determining a bounding region that encompasses the one or more graphics primitives, including generating a rasterized version of the bounding region;
generating binning data for a plurality of sub-regions that are each separate from the rasterized version of the bounding region, the binning data being based on the rasterized version of the bounding region and based on data that is generated by at least one tessellation processing stage of an on-chip, tessellation-enabled, graphics rendering pipeline that is implemented by a graphics processing unit (GPU), the binning data not being based on the one or more graphics primitives, the binning data indicating to which of the plurality of sub-regions of a render target the rasterized version of the bounding region contributes pixel data; and
performing a plurality of rendering passes based on the binning data, each of the rendering passes being performed for a respective one of the sub-regions of the render target.

40. The apparatus of claim 39, wherein determining the bounding region comprises determining a bounding region that is received by the GPU from a host processor.

41. The apparatus of claim 39, wherein the one or more primitives comprise a higher-order surface that is defined by a plurality of control points, and the bounding region comprises a convex hull that is determined based on the control points that define the higher-order surface.

42. The apparatus of claim 39, wherein the one or more primitives comprise two or more primitives, and the bounding region comprises a volume that encompasses the two or more primitives.

43. The apparatus of claim 39, wherein the bounding region comprises a bounding region that is used by a graphics application for collision detection.

44. A non-transitory computer-readable storage medium storing instructions that, when executed, cause one or more processors to:
perform tile-based rendering for one or more graphics primitives, wherein the tile based rendering comprises:
determine a bounding region that encompasses the one or more graphics primitives, including generating a rasterized version of the bounding region;
generate binning data for a plurality of sub-regions that are each separate from the rasterized version of the bounding region, the binning data being based on the rasterized version of the bounding region and based on data that is generated by at least one tessellation processing stage of an on-chip, tessellation-enabled, graphics rendering pipeline that is implemented by a graphics processing unit (GPU), the binning data not being based on the one or more graphics primitives; and
perform a plurality of rendering passes based on the binning data, each of the rendering passes being performed for a respective one of the sub-regions of the render target.

45. The non-transitory computer-readable storage medium of claim 44, wherein to determine the bounding region, the instructions cause the one or more processors to determine a bounding region that is received by the GPU from a host processor.

46. The non-transitory computer-readable storage medium of claim 44, wherein the one or more primitives comprise a higher-order surface that is defined by a plurality of control points, and the bounding region comprises a convex hull that is determined based on the control points that define the higher-order surface.

47. The non-transitory computer-readable storage medium of claim 44, wherein the one or more primitives comprise two or more primitives, and the bounding region comprises a volume that encompasses the two or more primitives.

48. The non-transitory computer-readable storage medium of claim 44, wherein the bounding region comprises a bounding region that is used by a graphics application for collision detection.

* * * * *